US011669798B2

(12) United States Patent
Sandberg et al.

(10) Patent No.: US 11,669,798 B2
(45) Date of Patent: *Jun. 6, 2023

(54) CLEARING INTERNATIONALLY SHIPPED ITEMS THROUGH GOVERNMENT CUSTOMS AGENCIES

(71) Applicant: KLEAREXPRESS CORPORATION, Santa Clara, CA (US)

(72) Inventors: Ulf Sandberg, San Jose, CA (US); Rick Tellez, San Jose, CA (US); Sam Tyagi, San Jose, CA (US)

(73) Assignee: KlearNow Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/728,372

(22) Filed: Apr. 25, 2022

(65) Prior Publication Data
US 2022/0245575 A1    Aug. 4, 2022

Related U.S. Application Data

(63) Continuation of application No. 16/202,996, filed on Nov. 28, 2018, now Pat. No. 11,348,055.
(Continued)

(51) Int. Cl.
*G06Q 10/08* (2023.01)
*G06F 16/23* (2019.01)
(Continued)

(52) U.S. Cl.
CPC ..... *G06Q 10/0831* (2013.01); *G06F 16/2358* (2019.01); *G06F 16/27* (2019.01); *G06Q 10/0833* (2013.01)

(58) Field of Classification Search
CPC ............ G06Q 10/0831; G06Q 10/0833; G06F 16/27; G06F 16/2358
(Continued)

(56) References Cited

U.S. PATENT DOCUMENTS

| 11,348,055 B2* | 5/2022 | Sandberg | G06F 16/27 |
| 2012/0123921 A1* | 5/2012 | Black | G06Q 30/0283 |
| | | | 705/331 |
| 2016/0125423 A1* | 5/2016 | Nour | G06Q 10/0831 |
| | | | 705/317 |

OTHER PUBLICATIONS

Luther, Don; "My Customs Broker Handles That"; Nov. 9, 2016. (Year: 2016).*

* cited by examiner

*Primary Examiner* — Resha Desai
*Assistant Examiner* — Dione N. Simpson
(74) *Attorney, Agent, or Firm* — Stevens Law Group; David R. Stevens

(57) ABSTRACT

The present invention extends to methods, systems, and computer program products for clearing internationally shipped items through government customs agencies. Aspects of the invention utilize a unifying database to consolidate information from different parties (e.g., government entities, shippers, carriers, brokers, and item recipients) associated with delivery of an internationally shipped item in a common location. The unifying database facilitates communication between different the parties that use different data protocols, different data formats, different data types, different EDI, etc., Parties can update relevant information corresponding to their responsibilities within the unified database. When one party updates information, other parties can be notified electronically in essentially real time of status changes relevant to item delivery. Brokers can be assigned for at-will clearance work based on broker profile information maintained in the unifying database.

20 Claims, 15 Drawing Sheets

Related U.S. Application Data

(60) Provisional application No. 62/591,538, filed on Nov. 28, 2017.

(51) Int. Cl.
    *G06F 16/27*     (2019.01)
    *G06Q 10/0831*     (2023.01)
    *G06Q 10/0833*     (2023.01)

(58) Field of Classification Search
    USPC .......................................................... 705/331
    See application file for complete search history.

US 11,669,798 B2

CLEARING INTERNATIONALLY SHIPPED ITEMS THROUGH GOVERNMENT CUSTOMS AGENCIES

CROSS-REFERENCE TO RELATED APPLICATIONS

This application is a continuation of U.S. patent application Ser. No. 16/202,996, filed Nov. 28, 2018, which claims the benefit of U.S. Provisional Patent Application Ser. No. 62/591,538 filed Nov. 28, 2017, which are incorporated by reference in their entirety

BACKGROUND

1. Field of the Invention

This invention relates generally to the field of international shipping, and, more particularly, to clearing internationally shipped items through government customs agencies.

2. Related Art

The volume of internationally shipped items per day is quite large and continues to increase. When an internationally shipped item enters a country, the importing country typically levees one or more import fees, such as, duties, VAT, or other taxes. Calculating import fees varies between countries and can be based on the sum of purchase cost, taxes, and shipping costs and of the description and category of the product that is shipped. Depending on a delivery arrangement, different parties to a transaction may be responsible for import fee payment. For example, a "Delivery At Place" (DAP) arrangement assigns import fee payment responsibility to a shipping payee (e.g., the item recipient) upon delivery of an item. On the other hand, a "Delivery Duty Paid" (DDP)) arrangement assigns import fee payment responsibility to an item seller.

Additionally, when an entity ships items DDP into a country, the entity is responsible for compliance with laws and regulations of importing items into the country (i.e., clearing customs). The customs tariffs, laws and regulations of each country can differ and can change frequently (sometimes even on a daily basis). A customs broker licensed in a country can assist with customs clearance in that country. However, many entities lack the infrastructure, financial resources, and/or desire to hire customs brokers as fulltime employees, especially in countries where shipping volume is low and/or sporadic.

As such, entities shipping items into a country may rely on a freight forwarder (e.g., contracted with a carrier) to engage a licensed customs broker or may attempt to engage a licensed customs broker on an ad hoc basis. When engaging a customs broker on their own, a shipping entity may perform various administrative tasks to vet the customs broker (e.g., validate broker license number, determine licensed countries, determine industries worked in, obtain references, etc.). However, when shipping deadlines are expedited, engaging a customs broker on an ad hoc basis may not be possible. A shipping entity may be relegated to relying on a customs broker selected by a freight forwarder. Unfortunately, there is no guarantee that a selected broker is reliable and/or has the appropriate skills to efficiently and effectively clear the items being shipped.

BRIEF DESCRIPTION OF THE DRAWINGS

The specific features, aspects and advantages of the present invention will become better understood with regard to the following description and accompanying drawings where.

DETAILED DESCRIPTION

Figure 1:
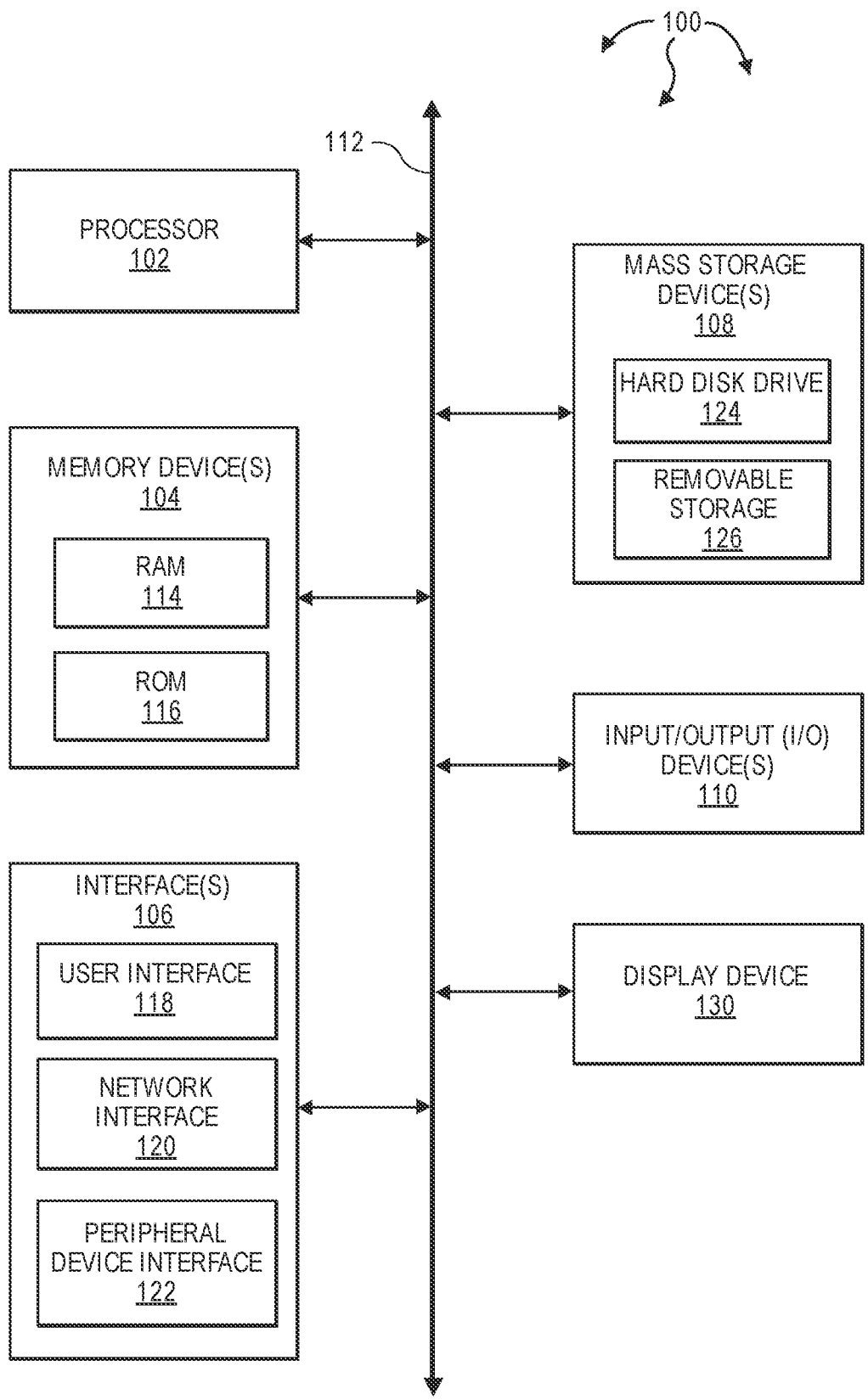
FIG. 1 illustrates an example block diagram of a computing device.

The present invention extends to methods, systems, and computer program products for clearing internationally shipped items through government customs agencies.

Aspects of the invention provide a fully automated Global Broker System that allows customs brokers around the world to sign up for at-will-work to handle the clearing process for the Companies that are shipping products globally. The automated Global Broker System promotes global commerce and drives down cost of clearance and shipping, which benefits all of the entities that are involved in international shipping. Lower costs are facilitated by bypassing shipping companies and enabling interaction directly between the Companies and the Brokers responsible for clearing their commodity. Companies of any size can benefit from the automated Global Broker System providing them increased freedom, flexibility and ultimately lower costs.

A variety of parties, such as, government entities, shippers, carriers, brokers, and item recipients, participate in the international shipping and each play some part in delivery of an internationally shipped item. Each party participating in international shipping may separately administer a computer and/or network system. As such, a plurality of separately administered computer and network systems can interoperate with one another, at least to some extent, to facilitate delivery of an internationally shipped item. That is, each individual party participating in an international shipping transaction may utilize their own computer and network systems and may interact with the computer and network systems of multiple other parties (N to N communication paths). Accordingly, when considered in the aggregate, the plurality of separately administered computer and network systems comprise the "international shipping system".

Various computer and network resource inefficiencies are present in the international shipping system. For example, shipping/delivery related activities performed by one party (e.g., manual processes) may not be quickly discernible by another dependent party. Additionally, performance of shipping/delivery related activities by different parties can redundantly generate and/or transport data to and from different computer and network systems. Separately administered computer and network systems can also use different data formats, different data interfaces, and different protocols. Use of different data formats, interfaces, and protocols at different separately administered computer and network systems increases data processing resource requirements across the international shipping system.

Accordingly, aspects of the invention utilize a unifying system and unifying database to consolidate shipping/delivery related information (e.g., generated by and relevant to different parties participating in the international shipping system) in a common (centralized) location. The unifying system and unifying database essentially operate as a centralized shipping information hub. Parties can interact with the unified system to update relevant information corresponding to their shipping/delivery related activities within the unified database. Using a unified system and unified database relieves each separately administered computer and network system from performing communication and data conversions for multiple other separately administered computer and network systems. Thus, data processing requirements at separately administered computer and network system are reduced. In turn, overall data processing requirements across the international shipping system are also reduced permitting the international shipping system to operate more efficiently and effectively. It gives global visibility to where the shipment is at any given time, regardless of the specific shipping mode at that time (sea, air, land) which is very hard, if not impossible to obtain, due to the siloed systems today.

When one party generates or updates information, other parties can be automatically notified electronically in essentially real time of status changes relevant to item delivery. Electronic messages can be sent using local messaging systems. For example, a local telephone number can be used to text an intended item recipient. When appropriate, local languages can also be used. Accordingly, information from customs, a shipper, a carrier, a broker, and an intended recipient are better integrated in a platform where parties cooperatively communicate to accomplish item delivery.

Information stored in the unifying database can be maintained in an anonymous format obscuring any personal information. Information associated with completed delivery transactions can be leveraged for reflective, prospective, projective, descriptive, predictive, prescriptive and other analytics, patterns and strategic decisions including providing analytic information and data sets back to carriers, governmental entities, or other companies. Collected data can span multiple carriers and multiple governmental entities. As such, item delivery insights not available to individual carriers or individual governmental entities can be derived from data stored in the unifying database.

FIG. 1 illustrates an example block diagram of a computing device 100. Computing device 100 can be used to perform various procedures, such as those discussed herein. Computing device 100 can function as a server, a client, or any other computing entity. Computing device 100 can perform various communication and data transfer functions as described herein and can execute one or more application programs, such as the application programs described herein. Computing device 100 can be any of a wide variety of computing devices, such as a mobile telephone or other mobile device, a desktop computer, a notebook computer, a server computer, a handheld computer, tablet computer and the like.

Computing device 100 includes one or more processor(s) 102, one or more memory device(s) 104, one or more interface(s) 106, one or more mass storage device(s) 108, one or more Input/Output (I/O) device(s) 110, and a display device 130 all of which are coupled to a bus 112. Processor(s) 102 include one or more processors or controllers that execute instructions stored in memory device(s) 104 and/or mass storage device(s) 108. Processor(s) 102 may also include various types of computer storage media, such as cache memory.

Memory device(s) 104 include various computer storage media, such as volatile memory (e.g., random access memory (RAM) 114) and/or nonvolatile memory (e.g., read-only memory (ROM) 116). Memory device(s) 104 may also include rewritable ROM, such as Flash memory.

Mass storage device(s) 108 include various computer storage media, such as magnetic tapes, magnetic disks, optical disks, solid state memory (e.g., Flash memory), and so forth. As depicted in FIG. 1, a particular mass storage device is a hard disk drive 124. Various drives may also be included in mass storage device(s) 108 to enable reading from and/or writing to the various computer readable media. Mass storage device(s) 108 include removable media 126 and/or non-removable media.

I/O device(s) 110 include various devices that allow data and/or other information to be input to or retrieved from computing device 100. Example I/O device(s) 110 include cursor control devices, keyboards, keypads, barcode scanners, microphones, monitors or other display devices, speakers, printers, network interface cards, modems, cameras, lenses, radars, CCDs or other image capture devices, and the like.

Display device 130 includes any type of device capable of displaying information to one or more users of computing device 100. Examples of display device 130 include a monitor, display terminal, video projection device, and the like.

Interface(s) 106 include various interfaces that allow computing device 100 to interact with other systems, devices, or computing environments as well as humans. Example interface(s) 106 can include any number of different network interfaces 120, such as interfaces to personal area networks (PANs), local area networks (LANs), wide area networks (WANs), wireless networks (e.g., near field communication (NFC), Bluetooth, Wi-Fi, etc., networks), and the Internet. Other interfaces include user interface 118 and peripheral device interface 122.

Bus 112 allows processor(s) 102, memory device(s) 104, interface(s) 106, mass storage device(s) 108, and I/O device(s) 110 to communicate with one another, as well as other devices or components coupled to bus 112. Bus 112 represents one or more of several types of bus structures, such as a system bus, PCI bus, IEEE 1394 bus, USB bus, and so forth.

In this description and the following claims, "personal information" is described as one or more portions of data that when considered individually or in the aggregate relate to the identity of a natural person or can be used to identify a natural person. Personal information is defined to include personally identifiable information (PII), sensitive personal information (SPI), or other information that can be used on its own or with other information to identify, contact, or locate a single person, or to identify an individual in context. Personal information can include but is not limited to: full name, first name, last name, home address (or portions thereof), email address, nation identification number, passport number, vehicle registration plate, driver's license, face, fingerprints, handwriting, credit card numbers, digital identity, date of birth, birthplace, login name, social media identifier, mobile telephone number, nickname, age, gender, employer, school name, criminal record, job position, etc.

In this description and the following claims, "Delivery At Place" (or DAP) is defined as a shipping arrangement denoting that an intended recipient is responsible for payment of import fees (e.g., duties, VAT, other taxes, etc.) associated with an item upon delivery of the item.

In this description and the following claims, "Delivery Duty Paid" (or DDP) is defined as a shipping arrangement where the seller bears the risks and costs, including import fees (e.g., duties, VAT, other taxes, etc.) and other charges of delivery an item.

In this description and the following claims, a "carrier" is defined as an entity that handles actual shipment of an item via one or more of: air, sea, or land In this description and the following claims, "electronic data interchange" (or EDI) is defined as an interface format for exchanging data, such as, for example, JavaScript Object Notation (JSON), eXtensible Markup Language (XML), message queue (MQ), etc.

In this description and the following claims, a "customs broker" or "broker" is defined as an entity (e.g., a person or corporation) that manages the customs clearing process for shipments/commodities being imported/exported from another country. Each country operates under a different set of rules and regulations regarding the transfer of goods entering or leaving their borders. A country can require a license to operate as a customs broker, with licensure including required knowledge of the rules and regulations of the country. A knowledgeable broker can streamline the process of shipping goods as well as identify and correct any irregularities with respect to rules and regulations.

Figure 2:
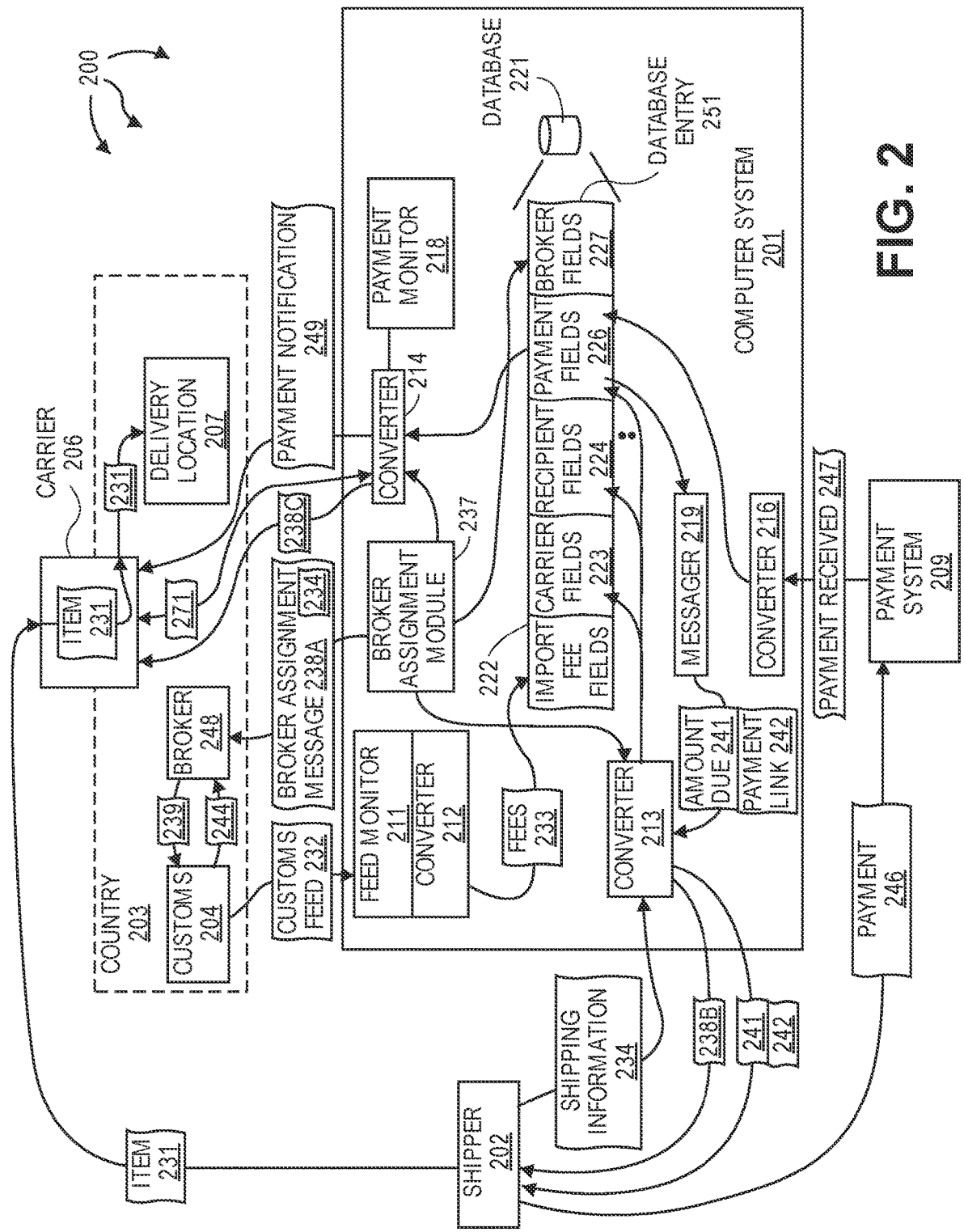
FIG. 2 illustrates an example computer architecture that facilitates clearing internationally shipped items through government customs agencies.

FIG. 2 illustrates an example computer architecture that facilitates clearing internationally shipped items through government customs agencies.

As depicted, computer architecture 200 includes computer system 201, shipper 202, customs 204, carrier 206, broker 237, and payment system 209. Computer system 201, shipper 202, customs 204, carrier 206, broker, and payment system 209 can be connected to (or be part of) a network, such as, for example, a system bus, a Local Area Network ("LAN"), a Wide Area Network ("WAN"), and even the Internet. Accordingly, computer system 201, shipper 202, customs 204, carrier 206, broker 237, and payment system 209 as well as any other connected computer systems and their components can create and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), Simple Object Access Protocol (SOAP), etc. or using other non-datagram protocols) over the network.

Various components depicted in computer architecture may also represent entire networks. For example, shipper 202 can represent a computer network of an E-commerce website. Carrier 206 can represent a computer network of a carrier that transports items internationally via any of land, sea, and air. Customs 204 can represent a computer network of a governmental agency that handles imports (and possibly exports) for country 203. Carrier 206 can have a physical presence both inside and outside of country 203.

At least some of shipper 202, customs 204, carrier 206, broker 237, and payment system 209 can be configured to communicate using different data protocols, different data formats, different data types, different EDI, etc. Thus, some of shipper 202, customs 204, carrier 206, broker 237, and payment system 209 may not be capable of natively communicating with others of shipper 202, customs 204, carrier 206, broker 237, and payment system 209. Computer system 201 can include converters configured to communicate with each of shipper 202, customs 204, carrier 206, broker 237, and payment system 209. For example, computer system 201 includes converter 212 configured to exchange electronic communication from custom 204, converter 213 configured to exchange electronic communication with shipper 202, converter 214 configured to exchange electronic communication with carrier 213, converter 216 configured to exchange electronic communication with payment system 209.

Computer system 201 also further includes feed monitor 211, payment monitor 218, messager 219, and database 221. From time to time, shipper 202 and/or carrier 206 can electronically send shipping information for an internationally shipped item that has entered or is to enter country 203. In response to receiving shipping information for an internationally shipped item, database 221 can create a database entry. Further information related to the internationally shipped item can be unified/consolidated in the database entry to facilitate efficient access.

Generally, customs 204 insures that an item has been imported in compliance with the rules and regulations or country 203. When an imported item is in compliance, customs 204 determines an import fees due amount for the imported item. As import fees due amounts are determined, the import fees due amounts can be output in customs feed 232. Feed monitor 211 is configured to monitor customs feed 232. Feed monitor 211 can detect import fees due amounts corresponding to internationally shipped items in database entries in database 221. For example, feed monitor 211 can match an import fees amount due to a database entry based on a carrier waybill or tracking number.

Generally, messager 219 is configured to message a party when data relevant to the party is created and/or updated by another party. For example, messager 219 can message a responsible party (payee), for example, either a shipper (e.g., under a DDP arrangement) or intended receipt (e.g., under a DAP arrangement) when an import fee is known. Messager 219 can send an import fee amount due and a payment link used to access payment system 209. The responsible party can access the payment link to access payment system 209 and pay the import fee amount due. Payment system 209 can accept any of a variety of payment methods including Credit card (MasterCard, VISA, American Express, Discover, JCB, Maestro, UATP or others), PayPal, Klara, BitCoin or any other electronic payment method.

Payment system 209 can indicate to computer system 201 that an import fee amount due has been paid. An indication of paid import fees can be stored in a database entry corresponding to an internationally shipped item. Messager 219 can access the indication from the database entry and electronically notify carrier 206 that when an internationally shipped item has cleared customs and when import fees for an internationally shipped item have been paid. Accordingly, carrier 206 is relieved from having to collect import fees due amounts from intended receipts and from having to settle incorrectly estimated import fees due amounts.

Messager 219 can also send a delivery instruction's link to an electronic address (e.g., mobile number or e-mail address) of an intended recipient. The delivery instructions link can link directly to a database entry in database 221. The intended recipient can use an electronic device to select the delivery instructions link and enter delivery instructions directly into the database entry. Messager 219 can then access the delivery instructions from the database entry and send the delivery instructions to carrier 206. As such, an intended recipient can authorize carrier 206 to leave an internationally shipped item, for example, when he or she is unavailable or unwilling to accept an internationally shipped item in person.

Computer system 201 can also include a database manager (now shown) that manages creating data entries in database 221, inserting data into fields in database 221, and accessing data from fields in database 221. Reference to computer system 201 performing database related activities can include interoperation with the database manager. In some aspects, the database manager has primary responsibility for performing database related activities.

Computer system 201 can also include an analytics module (not shown). The analytics module can analyze the contents of database 221 to derive reflective, prospective, projective, descriptive, predictive, prescriptive and other analytics, patterns and strategic decisions that span multiple carriers and governments. As such, item delivery insights not available to individual carriers or individual governmental entities can be derived from data stored in database 221. The analytics module can provide analytic information and data sets back to carriers, governmental entities, or other companies.

Broker assignment module 237 can assign a broker to handle an internationally shipped item. When shipping information for an item is received at database 221, broker assignment module 237 can be notified. Based on the shipping information for an item (e.g., country, type of item, time frame, etc.), broker assignment module 237 can assign a broker (from among a plurality of registered brokers) to handle clearing of the item. In one aspect, brokers licensed in different countries register with computer system 201 to perform at-will-work to handle the clearing process. When new shipping information for an item being shipped into a country is received, computer system 201 can select a broker licensed in the country to clear the item.

Figure 3A:
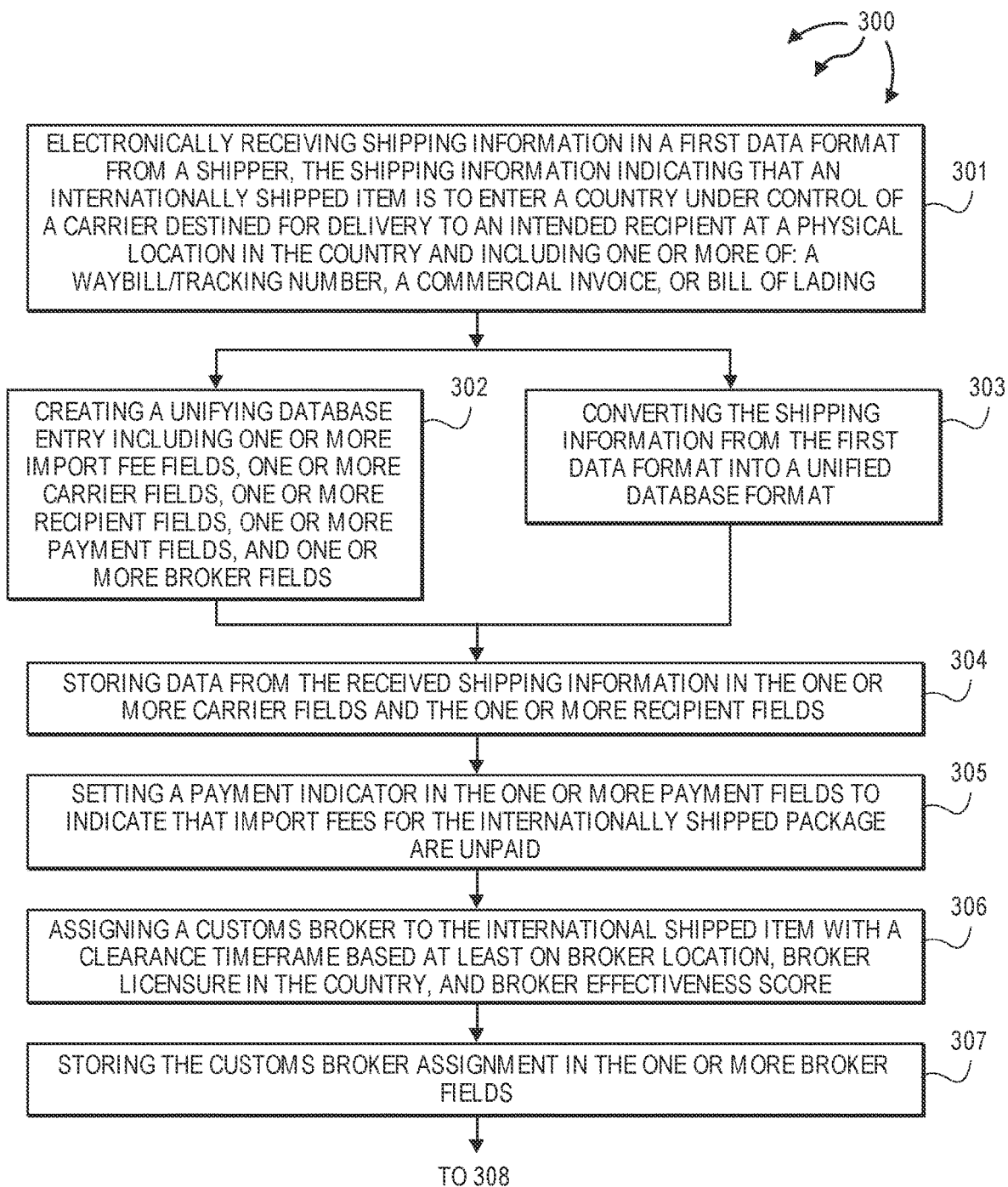
FIGS. 3A, 3B, and 3C illustrates a flow chart of an example method for clearing an internationally shipped item through a government customs agency.
Figure 3B:
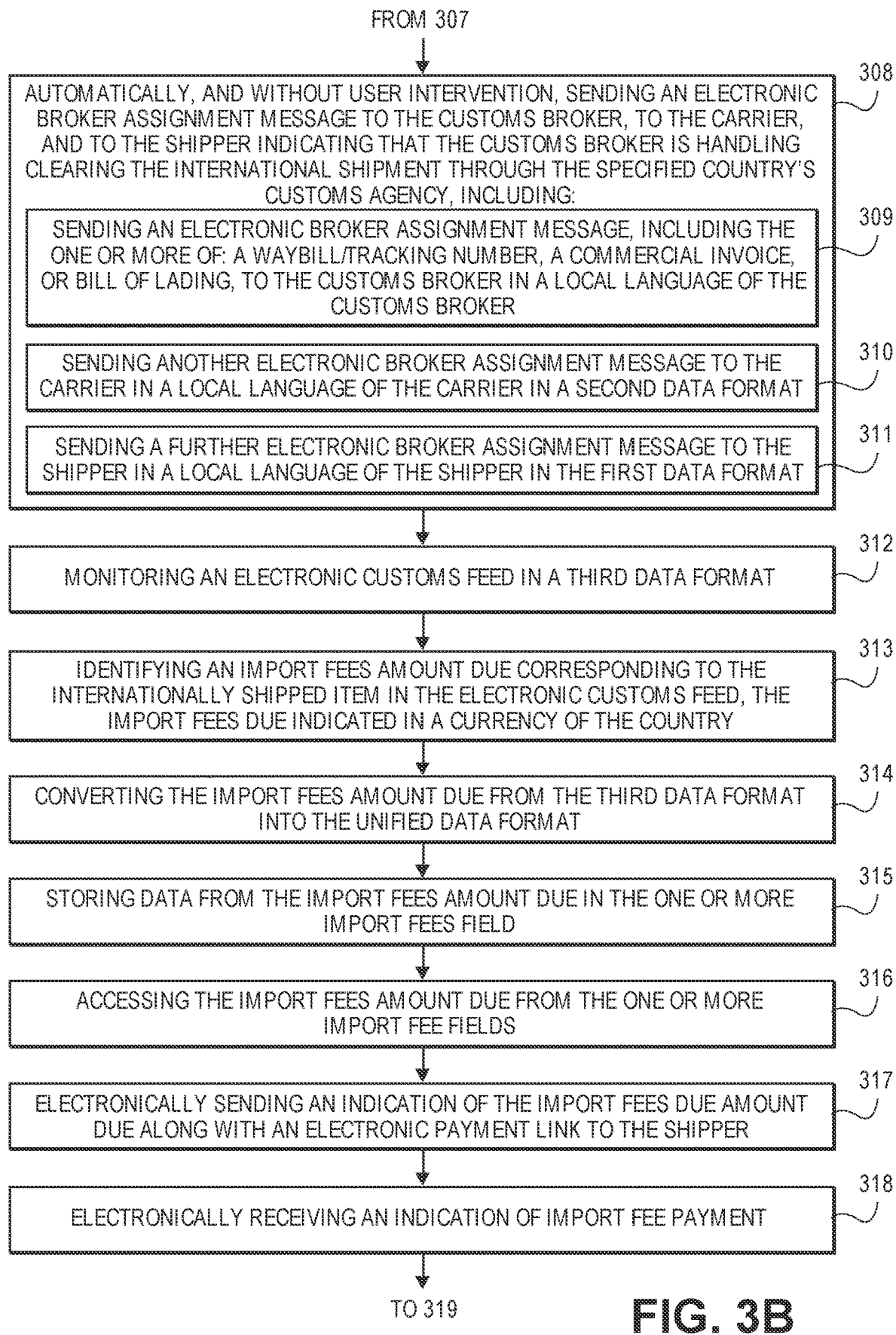
Figure 3C:
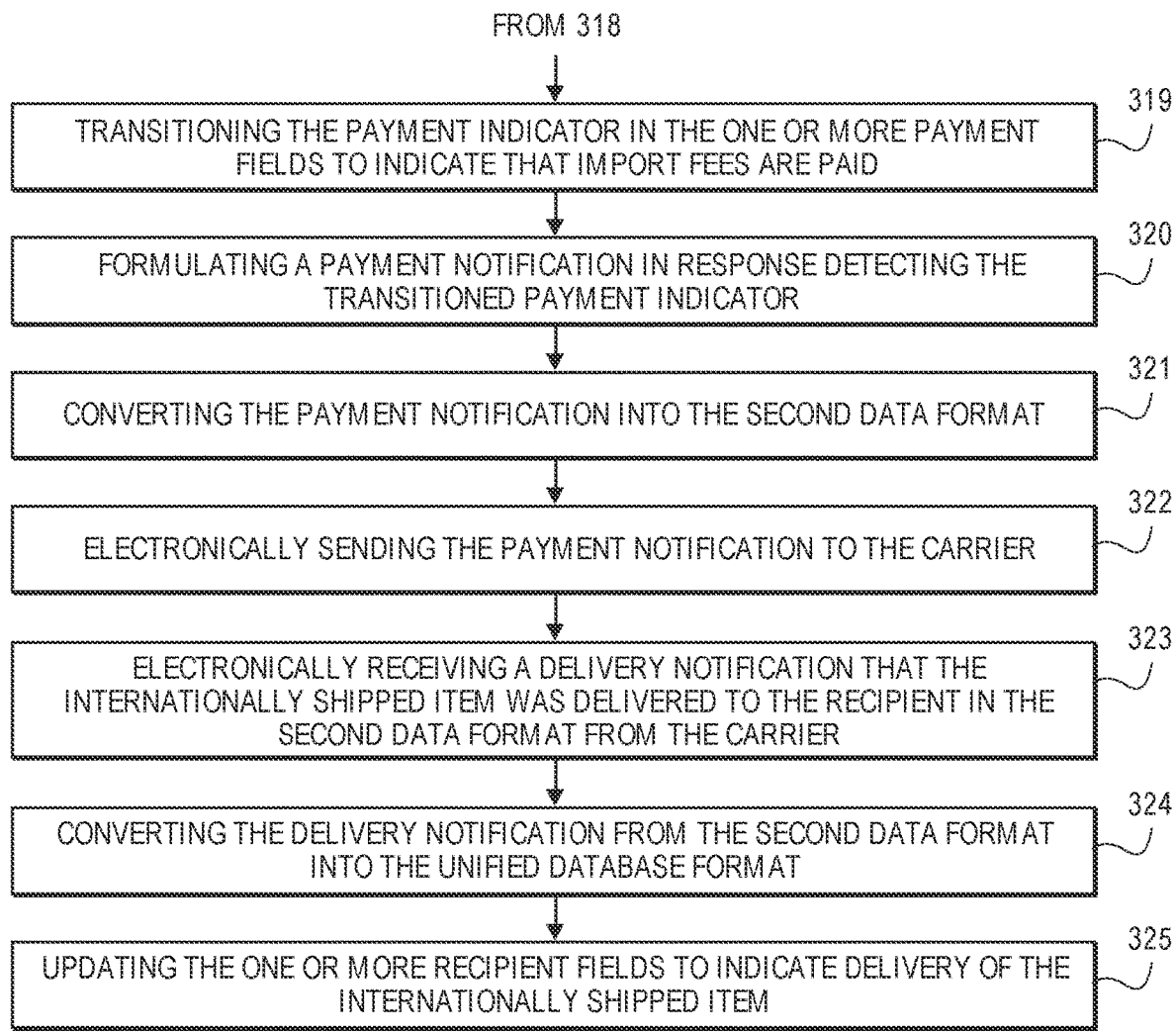

FIGS. 3A, 3B, and 3C illustrate a flow chart of an example method 300 for clearing an internationally shipped item through a government customs agency. Method 300 will be described with respect to the components and data in computer architecture 200.

Method 300 includes electronically receiving shipping information in a first data format indicating that an internationally shipped item is to enter a country under control of a carrier destined for delivery to an intended recipient at a physical location in the country (301). For example, shipper 202 can send shipping information 234 to computer system 201. Computer system 201 can receive shipping information 234 from shipper 202. Alternately, shipper 202 can send shipping information 234 to carrier 206. Carrier 206 in turn forwards shipping information 234 to computer system 201.

Shipping information 234 can indicate that item 231 is being internationally shipped to country 203 under the control of carrier 206 for delivery to an intended recipient at delivery location 207. Shipping information 234 can include one or more of a waybill/tracking number, a commercial invoice, or bill of lading. In one aspect, shipper 202 provides shipping information 234 and carrier 206 subsequently updates shipping information 234. For example, shipper 202 can send a waybill/tracking number and destination. Carrier 206 can update to indicate that item 231 has entered country 203. Shipping information 234 and shipping information 236 can be in different data formats.

Method 300 includes creating a unifying database entry including one or more import fee fields, one or more carrier fields, one or more recipient fields, one or more payment fields, and one or more broker fields (302). For example, in response to receiving shipping information 234, computer system 201 can create database entry 251 in database 221. As depicted, database entry 251 includes import fee fields 222, carrier fields 223, recipient fields 224, payment fields 226, and broker fields 227. Computer system 201 can use database entry 251 to unify information storage relating to internationally shipment of item 231.

Method 300 includes converting the shipping information from the first data format into a unified database format (303). For example, converter 213 can convert shipping information 234 into a format of database 221.

Method 300 includes storing data from the received shipping information in the one or more carrier fields and the one or more recipient fields (304). For example, computer system 201 can store data from shipping information 234 in carrier fields 223, recipient fields 224, and payment fields 226. Computer system 201 can also store data updates to shipping data from carrier 206 in carrier fields 223 and receipt fields 224). Data stored in carrier fields 223 can identify carrier 206 and track the shipping progress of item 231 from an originating location into country 203. Data stored in recipient fields 224 can identify an intended recipient and delivery location (e.g., address in country 203). Payment fields 226 can include a payment indicator and define payment responsibility (e.g., shipper 202 or to the intended recipient).

Method 300 includes setting a payment indicator in the one or more payment fields to indicate that import fees for the internationally shipped package are unpaid (305). For example, computer system 201 can set a payment indicator in payment fields 226 to indicate that import fees for item 231 are unpaid.

Method 300 includes assign a customs broker to the international shipped item with a clearance timeframe based at least on broker location, broker licensure in the country, and broker effectiveness score (306). For example, broker assignment module 237 can assign broker 248 to clear item 231 within a specified time frame. Broker assignment module 237 can assign broker 2348 based on the location of broker 248 (e.g., near where item 231 is to enter country 203), broker 248 being licensed in country 203, and an effectiveness score indicative of the historical effectiveness of broker 248 (e.g., relative to other brokers)

Method 300 includes store the customs broker assignment in the one or more broker fields (307). For example, broker assignment module 237 can store the assignment of broker 248 to clear item 231 in broker fields 227.

Method 300 includes automatically, and without user intervention, send an electronic broker assignment message to the customs broker, to the carrier, and to the shipper indicating that the customs broker is handling clearing the international shipment through the specified country's customs agency (308). For example, broker assignment module 237 can send broker assignment 238A to broker 248. Broker assignment module 237 can send broker assignment message 238B to shipper 202. Broker assignment module 237 can send broker assignment message 238C to carrier 206. Each of broker assignment messages 238A, 238B, and 238C can indicate that broker 248 is handling clearing item 231 with customs 204.

It may be that shipper 202, carrier 206, and broker 248 primarily operate in different languages. Computer system 201 can include various language modules (not shown) to translate messages into different languages. Computer system 201 can send messages to an entity in a requested language (e.g., indicated in a profile).

Sending an electronic broker assignment message to the customs broker can include sending an electronic broker assignment message, including the one or more of: a waybill/tracking number, a commercial invoice, or bill of lading, to the customs broker in a local language of the customs broker (309). For example, broker assignment module 237 can send broker assignment message 238A in a local language of broker 248 and can include shipping information 234.

Sending an electronic broker assignment message to the carrier can include sending another electronic broker assignment message to the carrier in a local language of the carrier in a second data format (310). For example, broker assignment module 237 can send broker assignment message 238C in a local language of carrier 206. Converter 214 can convert broker assignment message 238C from the unified database format to a format compatible with carrier 206.

Sending an electronic broker assignment message to the shipper can include sending a further electronic broker assignment message to the shipper in a local language of the shipper in the first data format (311). For example, broker assignment module 237 can send broker assignment message 238B in a local language of shipper 202. Converter 213 can convert broker assignment message 238B from the unified database format to a format compatible with shipper 202.

Method 300 includes monitoring an electronic customs feed in a third data format (312). For example, feed monitor 211 can monitor customs feed 232 in a format compatible with customs 204. Converter 212 can convert customs feed 232 into the unified database format.

Subsequent to receiving broker assignment message 238A, broker 248 can examiner shipping information 234. Broker 248 can also send any relevant information 239 to customs 204. Customs 204 can indicate any irregularities or non-compliance 244 associated with item 231 back to broker 248. When appropriate, broker 248 can request supplemental shipping information, for example, an updated waybill/tracking number, updated commercial invoice, or updated bill of lading, for remedying any irregularities or non-compliance associated with item 231 from computer system 201. A request for supplemental information can be noted in database entry 251.

Computer system 201 can forward the request (in an appropriate language and data formats) to shipper 202 (and/or carrier 206). Shipper 202 (and/or carrier 206) can return requested supplemental shipping information back to computer system 201. The requested supplemental shipping information can be stored in database entry 251. Computer system 201 can forward the supplemental shipping information to broker 237 (in an appropriate language and data format). Broker 248 can send the supplemental shipping information to customs 204.

When paperwork is in compliance, customs 204 can clear item 231 for entry into country 203 by indicating import fees 233 (in the currency of country 203) in customs feed 232.

Method 300 incudes identifying an import fees amount due corresponding to the internationally shipped item in the electronic customs feed, the import fees due indicated in a currency of the country (313). For example, feed monitor 211 can identify fees 233 corresponding to item 231 (e.g., by waybill/tracking number).

Method 300 includes converting the import fees amount due from the third data format into the unified data format (314). For example, converter 212 can convert fees 233 into the unified format of database 221. Method 300 includes storing data from the import fees amount due in the one or more import fees field (315). For example, computer system 201 can store fees 233, including an amount due and currency type, in import fee fields 222.

Method 300 incudes accessing the import fees amount due from the one or more import fee fields (316). For example, computer system 201 can access fees 233 from import fee fields 222. Method 300 includes electronically sending an indication of the import fees amount due along with an electronic payment link to the shipper (317). For example, computer system 201 can refer to payment fields 226 to determine that shipper 202 is responsible for payment of fees 233. Computer system 201 can formulate amount due 241 and payment link 242. Converter 213 can convert amount due 241 and payment link 242 into a format compatible with shipper 202, Computer system can send amount due 241 and payment link 242 to shipper 202.

Method 300 includes electronically receiving an indication of import fee payment (318). For example, shipper 202 can access payment link 242 and submit payment 246 to payment system 209. As described, any of a variety of payment methods including Credit card (MasterCard, VISA, American Express, Discover, JCB, Maestro, UATP or others), PayPal, Klara, BitCoin or any other electronic payment method can be used. Payment system 209 can handle converting received payment to the currency of country 203 and can settle payment of fees 233 with country 203.

When payment is received, payment system 209 can send payment received indicator 247 to computer system 201. Payment system 209 may use a different data format than shipper 202, carrier 206, and customs 204. Converter 216 can convert payment received indicator 247 into the unified format of database 221.

Method 300 includes transitioning the payment indicator in the one or more payment fields to indicate that import fees are paid (319). For example, in response to payment received indicator 247, computer system 201 can transition a payment indicator for item 231 in payment fields 226 to indicate that fees 233 are paid.

Method 300 includes formulating a payment notification in response detecting the transitioned payment indicator (320). For example, payment monitor 218 can monitor the payment indicator for item 231 in payment fields 226. When payment monitor 218 detects a transition in the payment indicator, computer system 201 can formulate payment notification 249. Method 300 includes converting the payment notification into the second data format (321). For example, converter 214 can convert payment notification 249 into a data format compatible with carrier 206. Method 300 includes electronically sending the payment notification to the carrier (322). For example, computer system 201 can send payment notification 249 to carrier 206. Thus, carrier 206 knows that item 231 has cleared customs and can be physically delivered without having to collect fees 233 at delivery time. As such, it is more likely that item 231 can be delivered in a single delivery attempt.

Based on payment notification 249, carrier 206 can deliver item 231 to delivery location 207.

Method 300 include electronically receiving a delivery notification that the internationally shipped item was delivered to the recipient in the second data format from the shipper (323). For example, subsequent to delivery of item 231, carrier 206 can send delivery notification 271 to computer system 201 in a format compatible with carrier 206. Computer system 201 can receive delivery notification 271 from carrier 206. Method 300 includes converting the delivery notification from the second data format into the unified database format (324). For example, converter 214 can convert delivery notification 271 into the unified format of database 221. Method 300 includes updating the one or more recipient fields to indicate delivery of the internationally shipped item (324). For example, computer system 201 can update recipient fields 224 to indicate that item 231 was delivered to delivery location 207. Computer system 201 can formulate, convert, and send corresponding delivery notifications to shipper 202 and broker 248.

Accordingly, computer system 201 provides a central compatible location for storing and accessing information related to the delivery of an internationally shipped item. Relevant parties can electronically communicate with and through computer system 201 and are relieved from having to communicate with multiple other parties in manual or otherwise incompatible formats, protocols, EDI, etc. Further, information and updates related to an internationally shipped item can be submitted to and accessed from computer system 201 asynchronously and in essentially real-time as available and/or when relevant to the delivery process. For example, carrier 206 may choose to hold item 231 at a warehouse until fees 233 are paid but can initiate delivery of item 231 to delivery location 207 essentially on demand after payment is received. As such, carrier 206 can strike an appropriate balance between resource consumption (e.g., fuel, vehicle maintenance, computing, etc.) and customer satisfaction.

Figure 4:
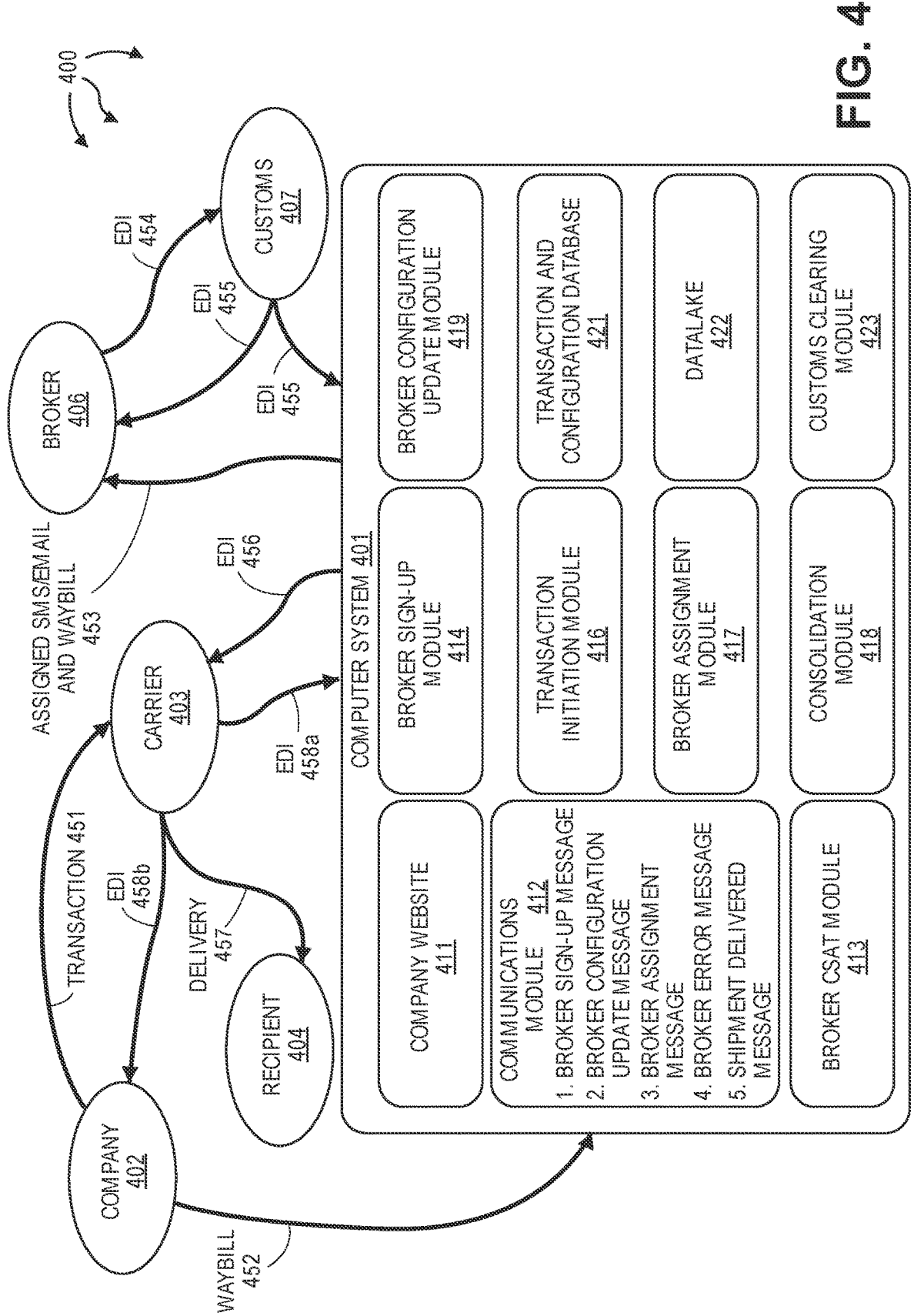
FIG. 4 illustrates another example computer architecture that facilitates clearing internationally shipped items through government customs agencies.

FIG. 4 illustrates another example computer architecture 400 that facilitates clearing internationally shipped items through government customs agencies. As depicted, computer architecture 400 includes computer system 401, company 402, carrier 403, recipient 404, broker 406, and customs 407. Computer system 401 further includes company website 411, communication module 412, broker CSAT module 413, broker sign-up module 414, transaction initiation module 416, broker assignment module 417, consolidation module 418, broker configuration update module 419, transaction and configuration database 421, data lake 422, and customs clearing module 423.

Generally, communications module 412 facilitates (e.g., network) communication between computer system 401 and other computer systems and networks, such as, those of company 402, carrier 403, recipient 404, broker 406, and customs 407. Communications module 412 can facilitate transmission of broker sign-up messages, broker configuration update messages, broker assignment messages, broker error messages, and shipment delivered messages.

Broker sign-up module 414 allows a Broker to sign up and become a partner with a centralized (and unifying) international shipping and customs clearance platform (e.g., implemented on computer system 401 and/or computer system 201). Once the sign-up is completed, the Broker can log in at any time and start accepting Broker Jobs, posted on a secure web site.

When a broker signs up the can enter the following information: Name, Company name (if currently doing business under LLC or Corp or other legal entity), Address, Broker license number, Broker license expiration, Countries Broker is licensed in (if more than default address country), Number of years of experience as Broker, How many clearances performed/expected to perform in a calendar month?, Have you done both formal and informal clearances in the past?, Do you have any long-term clients or customers that you would like us to contact and get set up on our network? (We can default their jobs to you if you are on-line and actively accepting jobs), What specific industry(ies) would you like to accept Clearing Jobs for (single or multiple selections), for example, fashion, food, oil/gas, furniture, pc's, electronics, semiconductors, biotechnology, pharmaceuticals or other, please specify. Are you available and willing to do special requests or off normal hour work that we would contact you directly (higher compensation could be included)?

After information is entered, broker sign-up module 414 can automatically check if the required information has been entered. If there is information missing or information doesn't match what's expected, an error message is display on the page so that the Broker can edit and correct missing or incorrect information.

When the Broker clicks on an Apply button, computer system 401 automatically validates if the Broker license number(s) is/are valid and if any other information is invalid or incorrect. If the Broker license number(s) cannot be validated or is incorrect or is invalid or any other needed information is incorrect, broker sign-up module displays an error message to the Broker so that Broker can edit the information and correct it. If all the information is correct as per specified error checking, the Broker is accepted Upon acceptance, broker sign-up module 414 automatically displays a welcome message and thank the Broker for signing up with links to additional information and how to get started. Broker sign-up module 414 also automatically sends an SMS message and/or an Email message to the Broker confirming the Broker signup with links to additional information and how to get started. Broker sign-up module 414 also automatically saves the sign-up information in the transaction and configuration database 421 (e.g., database 221).

Figure 5:
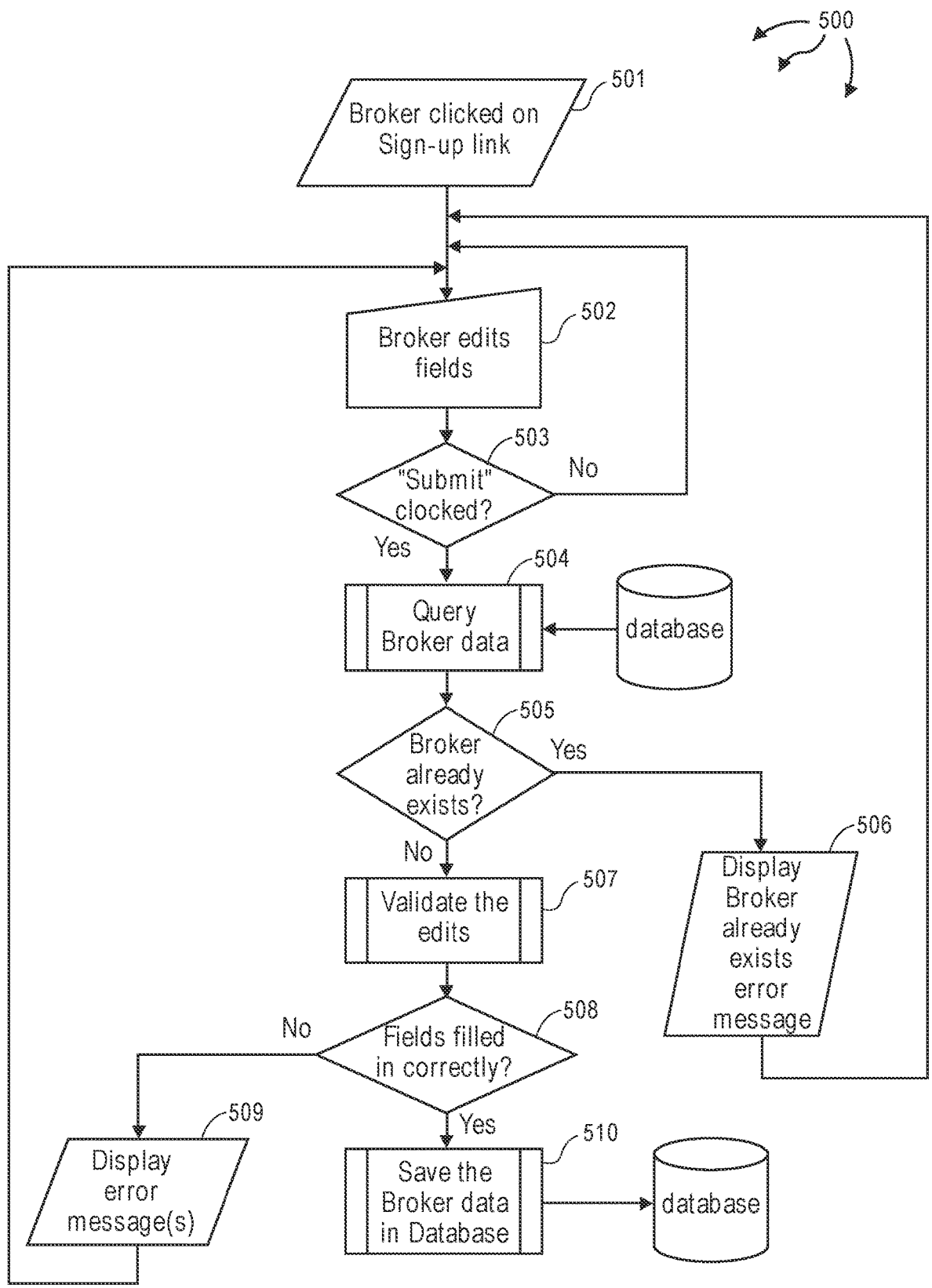
FIG. 5 illustrates a flow chart of an example method for broker signup.

FIG. 5 illustrates a flow chart of an example method 500 for broker signup. Broker sign-up module 414 can implement method 500. Method 500 includes a broker clicking on a sign-up link (501). Method 500 includes editing fields (502), for example, in transaction and configuration database 421 (e.g., database 221). Method 500 includes determining is submit is clocked (503). If submit is not clocked (NO at 503), method 500 returns to 502. If submit is clocked (YES at 503), method 500 includes querying broker data from transaction and configuration database 421 (e.g., database 221). Method 500 includes determining if the broker already exists (505).

If the broker already exists (YES at 505), method 500 includes displaying broker already exists error message and returning to 502. If the broker does not already exist (NO at 505), method 500 includes validating the edits (507). Method 500 includes determining if the fields were filled out correctly (508). If the fields were not filed out correctly (NO at 509), method 500 displays an error message and returns to 502. If the fields were filed out correctly (YES at 509), method 500 includes storing the broker data in transaction and configuration database 421 (e.g., database 221).

More specifically, when a broker sign-up is successfully completed, broker sign-up module 414 can send a welcome message to the Broker confirming the Broker signup with links to additional information and how to get started. Messages can be dynamically created from information in transaction and configuration database 421 (e.g., database 221). The information in the broker welcome message can include: date and time (when the Sign-up was completed and accepted), Broker license number, and Broker name. Messages can be built from templates with the above dynamic information inserted into the header and content of the messages. A broker welcome message can be created in the individual local language of the Broker per the Broker country information submitted when the Broker signed up.

Broker contact information can be retrieved from transaction and configuration database 421 (e.g., database 221). If the Broker has a mobile number, broker sign-up module 414 automatically builds a text message to the Broker. If the Broker has an email address, broker sign-up module 414 automatically builds an email to the Broker. If the Broker has both mobile number and email address, broker sign-up module 414 automatically builds both a text message and an email to the Broker. The formed text message and/or email can be sent to the broker and information of successfully transmission stored in transaction and configuration database 421 (e.g., database 221).

Figure 6:
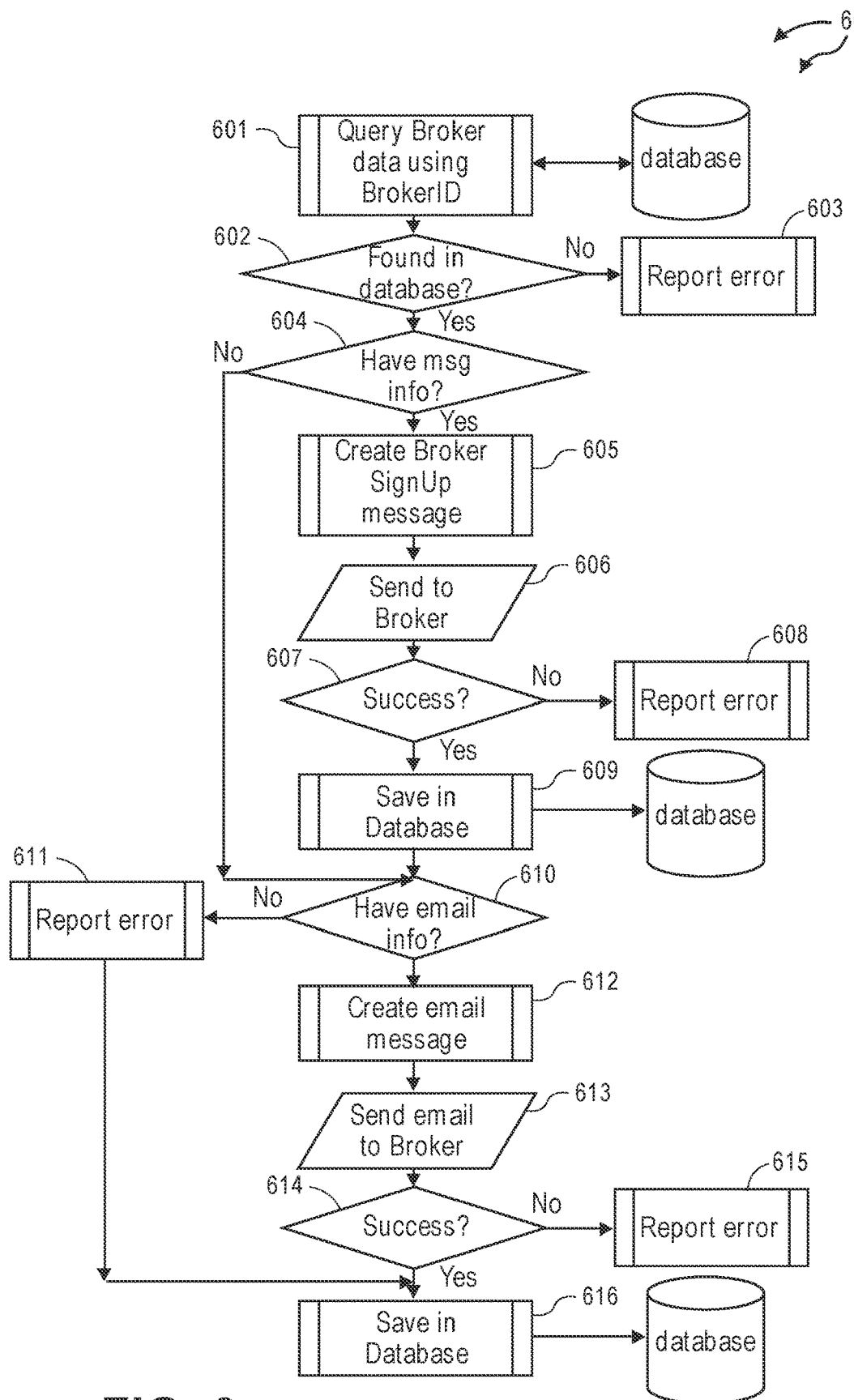
FIG. 6 illustrates a flow chart of an example method for sending a broker signup message.

FIG. 6 illustrates a flow chart of an example method 600 for sending a broker signup message. Broker sign-up module 414 and communications module 412 can interoperate to implement method 600. Method 600 includes querying broker from transaction and configuration database 421 (e.g., database 221) using brokerID (601). Method 600 includes determining if the broker was found in transaction and configuration database 421 (e.g., database 221) (602). If the broker was not found (NO at 602), method 600 includes reporting an error (603). If the broker was found (YES at 602), method 600 includes determining if there is broker information available for sending an SMS message (604). If information is not available for sending an SMS message (NO at 604), method 600 transitions to 610.

If information is available for sending an SMS message (YES at 604), method 600 includes creating an SMS broker signup message (605). Method 600 includes sending the SMS message to the broker (606). Method 600 includes determining if sending the SMS message was a success (607). If sending the SMS message was not a success (NO at 607), method 600 includes reporting an error (608). If sending the SMS message was a success (YES at 607), method 600 includes saving an indication of successfully sending the SMS in transaction and configuration database 421 (e.g., database 221) (609).

Method 600 includes determining if there is broker information available for sending an Email message (610). If information is not available for sending an Email message (NO at 610), method 600 includes reporting an error (611). If information is available for sending an Email message (YES at 610), method 600 includes creating an Email broker signup message (612). Method 600 includes sending the Email message to the broker (613). Method 600 includes determining if sending the Email message was a success (614). If sending the Email message was not a success (NO at 614), method 600 includes reporting an error (615). If sending the Email message was a success (YES at 614), method 600 includes saving an indication of successfully sending the Email message in transaction and configuration database 421 (e.g., database 221) (616).

Broker configuration update module 419 allows a Broker to sign in on an appropriate website and update any of the Brokers profile information. Example updates can include (but not limited to): Broker's address, Broker's company name (if currently doing business under LLC or Corp or other legal entity), Broker's license expiration date(s), Broker's login name, Broker's password, Broker's experience, Broker's preferences, etc. When a broker starts in enter information, broker configuration update module 419 automatically checks if the required information has been entered as it is filed in. If there is information missing or information does not match what is expected, broker configuration update module 419 displays an error message on the page so that the Broker can edit and correct missing or incorrect information.

When the broker clicks an apply button, broker configuration update module 419 automatically validates if any information is invalid or incorrect. If incorrect or invalid information is detected, broker configuration update module 419 displays an error message to the Broker so that Broker can edit the information and correct it. If all the information is correct as per specified error checking, broker information is updated.

Upon updating broker information, broker configuration update module 419 automatically displays an update completed message. Broker configuration update module 419 also automatically sends a broker update message to the broker confirming the configuration updates. Broker configuration update module 419 also automatically saves the configuration updates in the transaction and configuration database 421 (e.g., database 221).

More specifically, when a Broker configuration update is completed and successful, broker configuration update module 419 can send a welcome message to the Broker confirming the Broker configuration update. Broker configuration update module 419 can dynamically create the message from information in transaction and configuration database 421 (e.g., database 221).

The information in the broker welcome message can include: date and time (when the configuration update was completed and accepted), Broker license number, and Broker name. Messages can be built from templates with the above dynamic information inserted into the header and content of the messages. A broker welcome message can be created in the individual local language of the Broker per the Broker country information submitted when the Broker signed up.

Broker contact information can be retrieved from transaction and configuration database 421 (e.g., database 221). If the Broker has a mobile number, broker configuration update module 419 automatically builds a text message to the Broker. If the Broker has an email address, broker configuration update module 419 automatically builds an email to the Broker. If the Broker has both mobile number and email address, broker configuration update module 419 automatically builds both a text message and an email to the Broker. The formed text message and/or email can be sent to the broker and information of successfully transmission stored in transaction and configuration database 421 (e.g., database 221).

Figure 7:
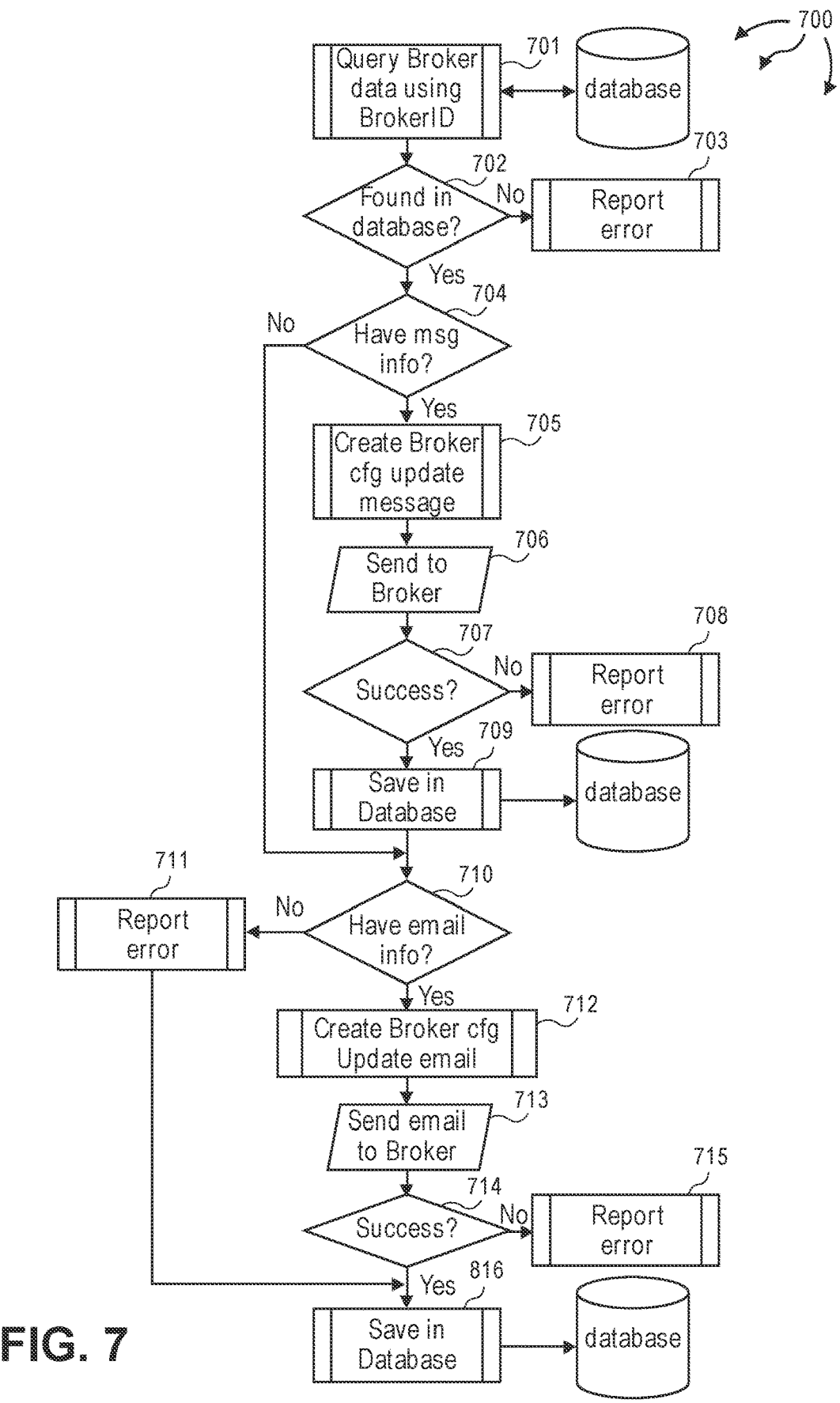
FIG. 7 illustrates a flow chart of an example method for sending a broker configuration update message.

FIG. 7 illustrates a flow chart of an example method 700 for sending a broker configuration update message. Broker configuration update module 419 and communications module 412 can interoperate to can implement method 700. Method 700 includes querying broker from transaction and configuration database 421 (e.g., database 221) using brokerID (701). Method 700 includes determining if the broker was found in transaction and configuration database 421 (e.g., database 221) (702). If the broker was not found (NO at 702), method 700 includes reporting an error (703). If the broker was found (YES at 702), method 700 includes determining if there is broker information available for sending an SMS message (704). If information is not available for sending an SMS message (NO at 704), method 700 transitions to 710.

If information is available for sending an SMS message (YES at 704), method 700 includes creating an SMS broker configuration update message (705). Method 700 includes sending the SMS message to the broker (706). Method 700 includes determining if sending the SMS message was a success (707). If sending the SMS message was not a success (NO at 707), method 700 includes reporting an error (708). If sending the SMS message was a success (YES at 707), method 700 includes saving an indication of successfully sending the SMS message in transaction and configuration database 421 (e.g., database 221) (709).

Method 700 includes determining if there is broker information available for sending an Email message (710). If information is not available for sending an Email message (NO at 710), method 700 includes reporting an error (711). If information is available for sending an Email message (YES at 710), method 700 includes creating an Email broker configuration update message (712). Method 700 includes sending the Email message to the broker (713). Method 700 includes determining if sending the Email message was a success (714). If sending the Email message was not a success (NO at 714), method 700 includes reporting an error (715). If sending the Email message was a success (YES at 714), method 700 includes saving an indication of successfully sending the Email message in transaction and configuration database 421 (e.g., database 221) (716).

Transaction initiation module 416 can initiate the process of clearing an international shipping transaction. For example, a customer can order a product from a company selling consumer goods online to be shopped to an international destination. Likewise, an importer can issue a purchase order to an offshore manufacturer, in a different country than the importer, to be imported to the importers country when the goods have been manufactured and/or assembled and are ready to be shipped. The Company can sign up a Carrier to ship the product to the requested international destination, which will require customs clearing. Transaction initiation module 416 can receive the order information from the Company and saves the order information in transaction and configuration database 421 (e.g., database 221) and data lake 422.

Time from transaction initiation to the customs clearing can vary, depending on the originating and receiving countries, Carrier type and many other factors. The order information from the Company can be sent to transaction initiation module 416 through an electronic interface and can be any type of software interface format such as JSON, XML or any other EDI interface. The following information (but not limited to) can be capture by transaction initiation module 416 and saved in transaction and configuration database 421 (e.g., database 221): Package ID (Waybill manifest), Company ID, Company contact information, Carrier, Total costs (excluding clearing fees since they are not known at this point in time), Package content information, and Recipient contact information.

Figure 8:
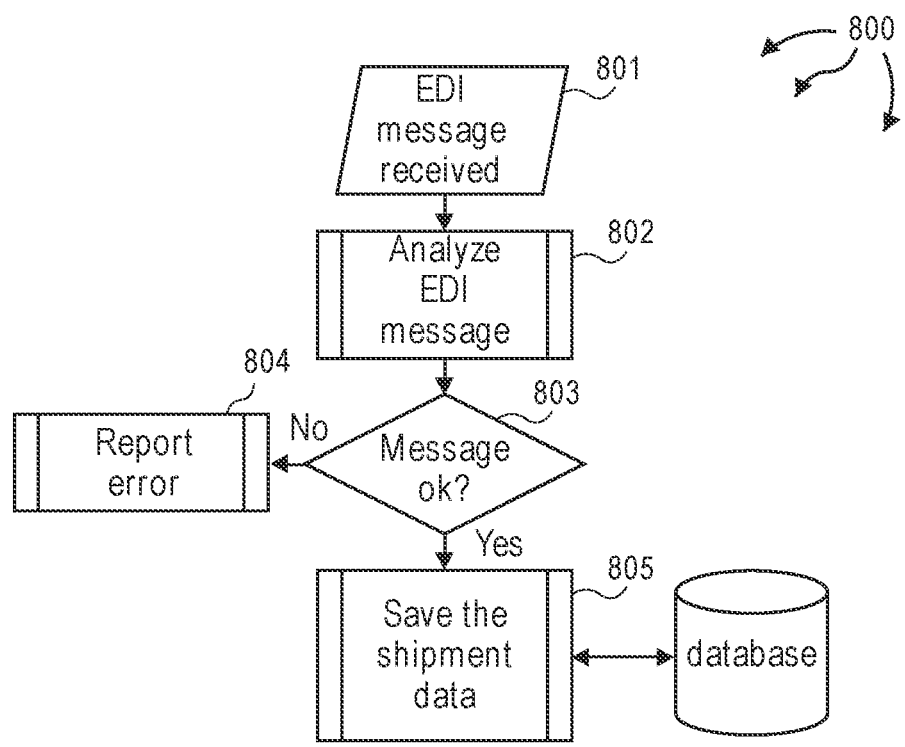
FIG. 8 illustrates a flow chart of an example method for initiating a transaction.

FIG. 8 illustrates a flow chart of an example method 800 for initiating a transaction. Transaction initiation module 416 can implement method 800. Method 800 includes receiving an EDI message (801). Method 800 includes analyzing the EDI message (802). Message 800 includes determining if the EDI message is ok (803). If the EDI message is not ok (NO at 803), method 800 includes reporting an error (804). If the EDI message is ok (YES at 803), method 800 includes storing the EDI message transaction and configuration database 421 (e.g., database 221).

After transaction initiation module 416 stores an EDI message, broker assignment module 417 can use information from the EDI message to serve up a broker job at an appropriate website so that brokers can be assigned and perform the customs clearing process. Broker assignment module 417 can support at least two different configurable broker assignment modes: (1) proprietary automatic assignment mode and (2) broker self-assignment mode.

Proprietary automatic assignment mode is a fully automatic mode that assigns a Broker to a clearing job automatically. A Broker can be assigned to a clearing job based on an assignment algorithm that considers the following information: Broker CSAT score, Broker location, Countries Broker licensed in (if more than default address country), Number of years of experience as Broker, Number of clearances typically done/expect in a calendar month?, Performed formal and informal clearances in the past?, Long-term clients or customers can be Auto assigned as default setting. What industry(ies) would you like to accept Clearing Jobs for (single or multiple selections)?, such as, for example, fashion, food, oil/gas, furniture, pc's, electronics, semiconductors, biotechnology, pharmaceuticals, other please specify, availability to do special requests or off normal hour works?, auto assignment of a Broker for specific Companies, etc.

Self-assignment mode allows a Broker to select a clearing job, from a list of available clearing jobs, that the Broker would like to own and perform the clearing process on.

Broker assignment module 417 can maintain a clearing job website that displays job listings for a number of clearing jobs. A displayed job listing can include date and time (when job was created), Country where clearing takes place, Shipper, Recipient, Content description, HTS CODE, Declared Value, Cost of shipping, Country of Origin, and Status (new, assigned, accepted, cleared, delivered). A broker can sign-in to see job listings. Brokers with an existing profile can see listings that fit their profile. Brokers can filter displayed listings to refine what is being display. Broker assignment module 417 can implement filters based on: Status (new, assigned, accepted, cleared, delivered), Origin country, Destination country, Date/time filter, etc.

When broker assignment module 417 assigns a clearing job to a broker, the broker can click an accept button to accept the assigned job. When a clearing job assignment is accepted, broker assignment module 417 (1) locks a shipment to the assigned broker, (2) sends assignment messages to the broker, to the carrier, and to the company (shipper), and (3) updates transaction and configuration database 421 (e.g., database 221). The Broker is now responsible for managing the clearing process for the shipment(s) that they were Assigned to. If the Broker does not clear the shipment within an assigned timeframe (configurable), broker assignment module 417 sends a broker error message, removes the current broker assignment, and reassigns the shipment to a different broker.

As described, when a broker assignment is approved, broker assignment module 417 can send a message to the broker, to the carrier, and to the company (shipper) indicating that the Broker is handling the clearing process for that specific shipment. By default, broker assignment module 417 attempts to send a text and email message to the Broker and Company and an EDI message to the Carrier. However, message type is configurable in transaction and configuration database 421 (e.g., database 221). As such, essentially any combination of text message, email message and EDI message can be sent per the individual requirements of the Broker, Carrier and Company.

Broker assignment module 417 can dynamically create a broker assignment message to be sent to the Broker, Carrier and Company. Information in broker assignment message can include: Date and time (when job was created), Date and time (when job was assigned), Broker license number, Broker name, Shipper, Recipient, Content description, HTS CODE, Declared Value, Cost of shipping, Country of Origin, and JobID. Broker assignment messages can be built from templates with the above dynamic information inserted into the header and content of the messages. Text messages and email messages can be created in the individual local language of the recipient (Broker, Carrier and Company) and hence can be in multiple languages when appropriate.

Broker assignment module 417 can retrieve contact information from transaction and configuration database 421 (e.g., database 221). An EDI can be any type of software interface format such as JSON, XML or any other EDI interface. If the Broker has a mobile number, broker assignment module 417 build a text message to the Broker. If the Broker has an email address, broker assignment module 417 build an email to the Broker. If the Broker has both mobile and email address, broker assignment module 417 build both a text message and an email to the Broker. If the Company has a mobile number, broker assignment module 417 build a text message to the Company. If the Company has an email address, broker assignment module 417 build an email to the Company. If the Company has both mobile and email address, broker assignment module 417 build both a text message and an email to the Company. When the text message(s)/email(s) has been formed, it will be sent to the Broker and Company and the information is saved in contact information from transaction and configuration database 421 (e.g., database 221).

Figure 9:
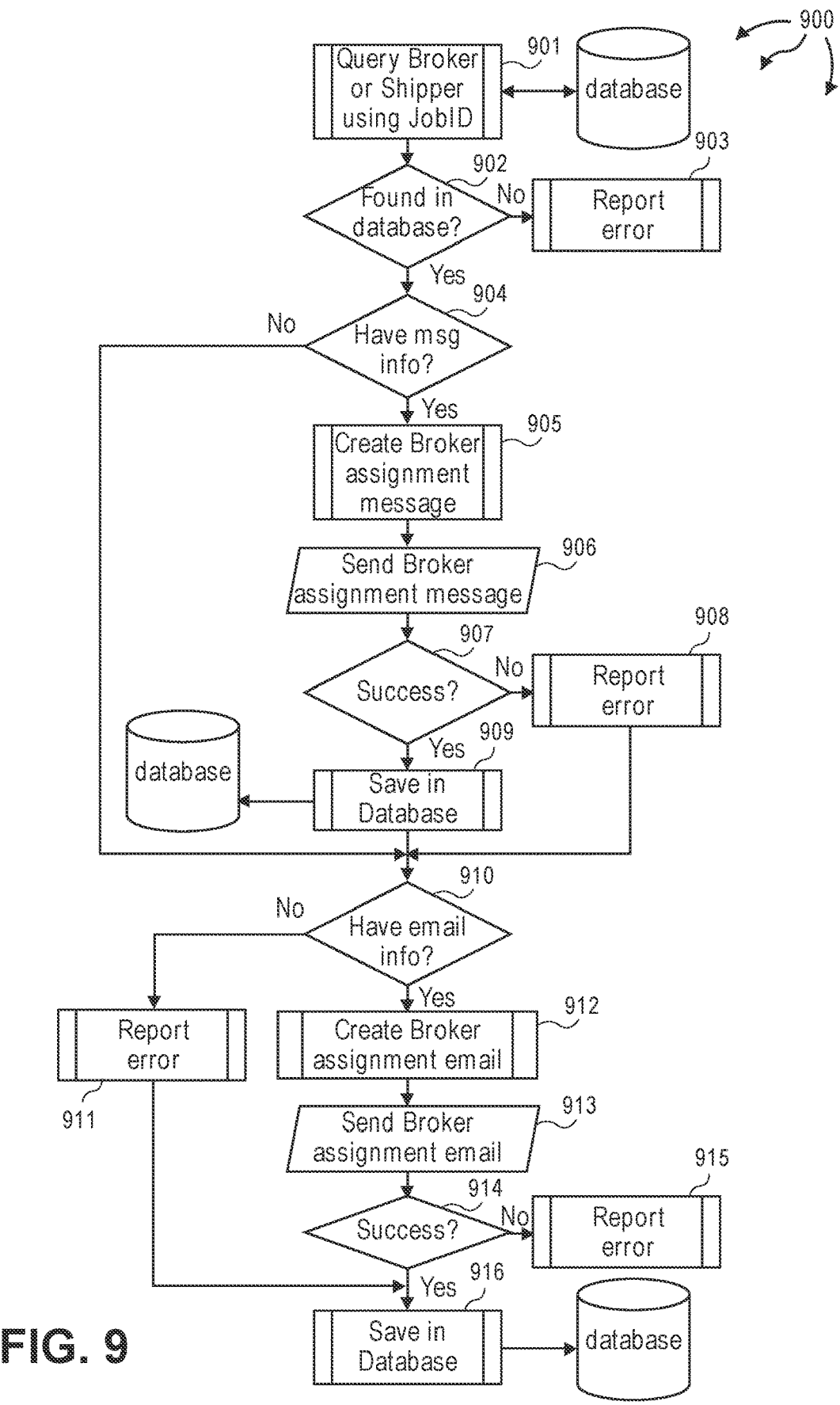
FIG. 9 illustrates a flow chart of an example method for sending a broker assignment message to a broker or shipper.

FIG. 9 illustrates a flow chart of an example method 900 for sending a broker assignment message to a broker or shipper. Broker assignment module 417 and communications module 412 can interoperate to implement method 900. Method 900 includes querying broker or shipper information from transaction and configuration database 421 (e.g., database 221) using JobID (901). Method 900 includes determining if broker information or shipper information was found in transaction and configuration database 421 (e.g., database 221) (902). If broker information or shipper information was not found (NO at 902), method 900 includes reporting an error (903). If broker information or shipper information was found (YES at 902), method 900 includes determining if there is broker information or shipper information available for sending an SMS message (904). If information is not available for sending an SMS message (NO at 904), method 900 transitions to 910.

If information is available for sending an SMS message (YES at 904), method 900 includes creating an SMS broker assignment message (905). Method 900 includes sending the SMS broker assignment message to the broker or shipper (906). Method 900 includes determining if sending the SMS message was a success (907). If sending the SMS message was not a success (NO at 907), method 900 includes reporting an error (908). If sending the SMS message was a success (YES at 907), method 900 includes saving an indication of successfully sending the SMS message in transaction and configuration database 421 (e.g., database 221) (909).

Method 900 includes determining if there is broker information or shipper information available for sending an Email message (910). If information is not available for sending an Email message (NO at 910), method 900 includes reporting an error (911). If information is available for sending an Email message (YES at 910), method 900 includes creating an Email broker assignment message (912). Method 900 includes sending the Email message to the broker or shipper (913). Method 900 includes determining if sending the Email message was a success (914). If sending the Email message was not a success (NO at 914), method 900 includes reporting an error (915). If sending the Email message was a success (YES at 914), method 900 includes saving an indication of successfully sending the Email message in transaction and configuration database 421 (e.g., database 221) (916).

Figure 10:
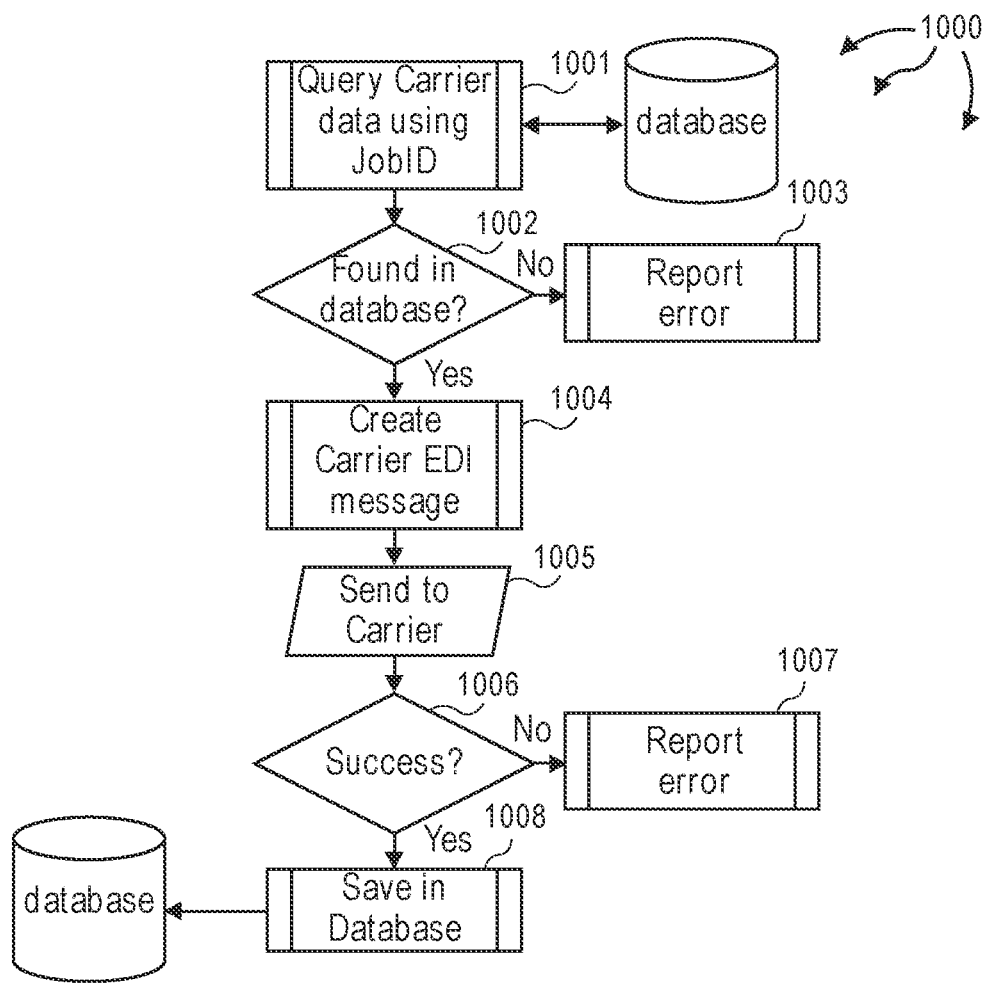
FIG. 10 illustrates a flow chart of an example method for sending a broker assignment message to a carrier.

FIG. 10 illustrates a flow chart of an example method 1000 for sending a broker assignment message to a carrier. Broker assignment module 417 and communications module 412 can interoperate to implement method 1000. Method 1000 includes querying carrier information from transaction and configuration database 421 (e.g., database 221) using Job ID (1001). Method 1000 includes determining if carrier information was found in transaction and configuration database 421 (e.g., database 221) (1002). If carrier was not found (NO at 1002), method 1000 includes reporting an error (1003). If information was found (YES at 1002), method 900 includes creating a carrier EDI broker assignment message (1004). Method 1000 includes sending the EDI message to the carrier (1005).

Method 1000 includes determining if sending the EDI message was a success (1006). If sending EDI message was not a success (NO at 1006), method 1000 includes reporting an error (1007). If sending the EDI message was a success (YES at 1006), method 1000 includes saving an indication of successfully sending the EDI message in transaction and configuration database 421 (e.g., database 221) (1008).

When the shipment has been cleared in customs with the assistance of the Broker and the customs/VAT and other fees are finally known and calculated, customs clearing module 423 can inform the Carrier and the Broker of customs clearance through an EDI message. Customs clearing module 423 can "tap" into a customs EDI workflow (a customs feed, such as, customs feed 232) without interrupting the customs EDI workflow. The "tap" electronic interface can be any type of software interface format such as JSON, XML or any other EDI interface.

Customs clearing module 423 can capture the following information from EDI messages in a customs EDI workflow: Package ID (Waybill manifest), Carrier, Broker, Total clearing fees (what the Payee has to pay), Package content information, Company contact information, Recipient contact information, etc. Customs clearing module 423 can save the captured information to transaction and configuration database 421 (e.g., database 221) and data lake 422.

Figure 11:
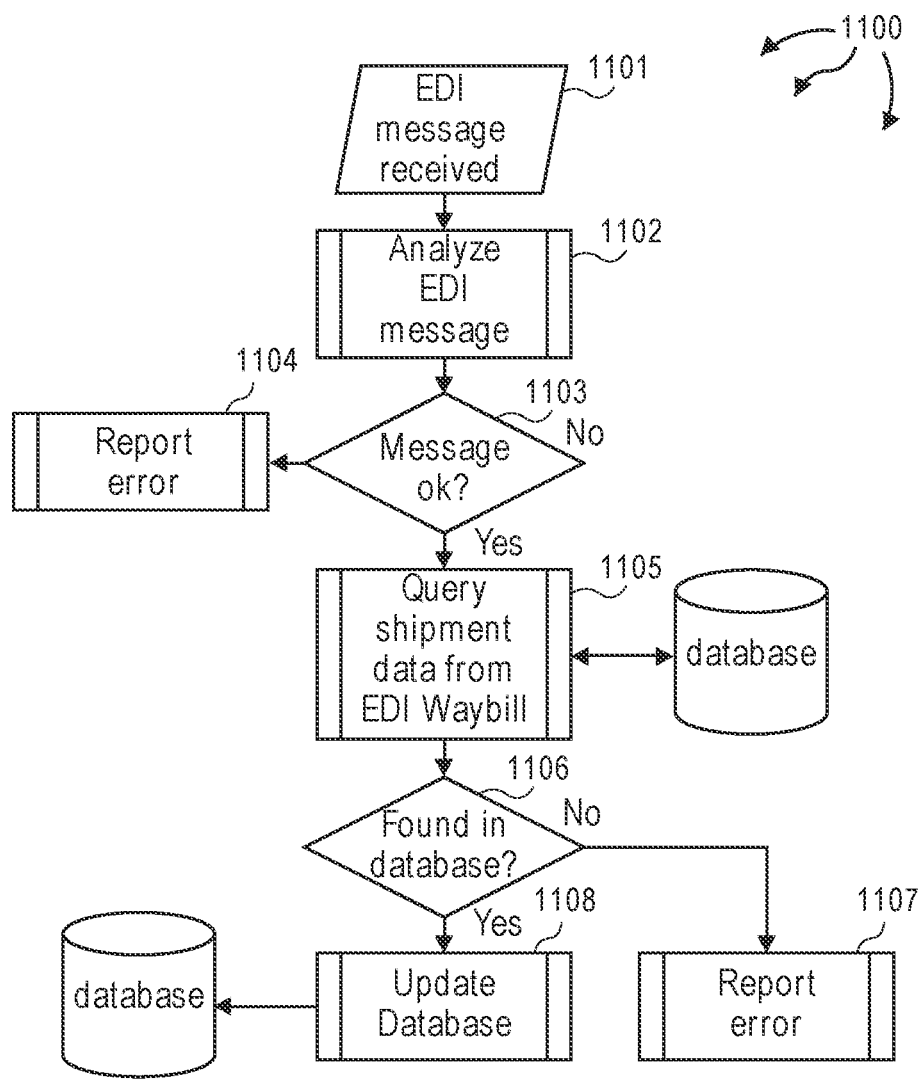
FIG. 11 illustrates a flow chart of an example method for sending a customs clearance message.

FIG. 11 illustrates a flow chart of an example method 1110 for sending a customs clearance message. Customs clearing module 423 and communications module 412 can interoperate to implement method 1100. Method 1100 includes receiving an EDI message (e.g., from a customs feed) (1101). Method 1100 includes analyzing the EDI message (1102). Message 1100 includes determining if the EDI message is ok (1103). If the EDI message is not ok (NO at 1103), method 1100 includes reporting an error (1104). If the EDI message is ok (YES at 1103), method 1100 includes querying shipment data from EDI waybill in transaction and configuration database 421 (e.g., database 221) (to determine if the EDI message corresponds to a shipment being tracked by computer system 401) (1105).

Method 1100 incudes determining if the shipment data was found in transaction and configuration database 421 (e.g., database 221) (1106). If the shipment data was not found (NO at 1106), method 1100 includes reporting an error. If the shipment data was found (YES at 1106), method 100 includes updating transaction and configuration database 421 (e.g., database 221) with information from the EDI message (1108).

If a Broker does not clear a shipment within an allocated timeframe, broker assignment module 417 can send a message to the Broker that the Broker has not completed the clearing process for that specific shipment, regardless of the reason, and that they have been removed from clearing it and that the shipment is being assigned to a different Broker. Broker assignment module 417 can also remove the current Broker Assignment and open it up to other Brokers to Assign (e.g., can relist on website). Broker assignment module 417 also updates transaction and configuration database 421 (e.g., database 221) to indicate removal of the current broker.

Broker assignment module 417 dynamically creates a message to be sent to the broker. The message can include: Clearing job Assignment cancelled message, Date and time (when job was created), Date and time (when job was Assigned), Broker license number, Broker name, Carrier, Company, Recipient, Content description, HTS CODE, Declared Value, Cost of shipping, Country of Origin. Broker error messages can be built from templates with the above dynamic information inserted into the header and content of the messages. Broker error messages can be created in the individual local language of the Broker.

Broker assignment module 417 can access contact information for a broker from transaction and configuration database 421 (e.g., database 221). If the Broker has a mobile number, broker assignment module 417 can build a text message to the Broker. If the Broker has an email address, broker assignment module 417 can build an email to the Broker. If the Broker has both mobile and email address, broker assignment module 417 can build both a text message and an email to the Broker. Broker assignment module 417 can send the text broker error message and/or email broker error message to the broker. Broker assignment module 417 can update transaction and configuration database 421 (e.g., database 221) to indicate that the text broker error message and/or email broker error message was sent to the broker.

Figure 12:
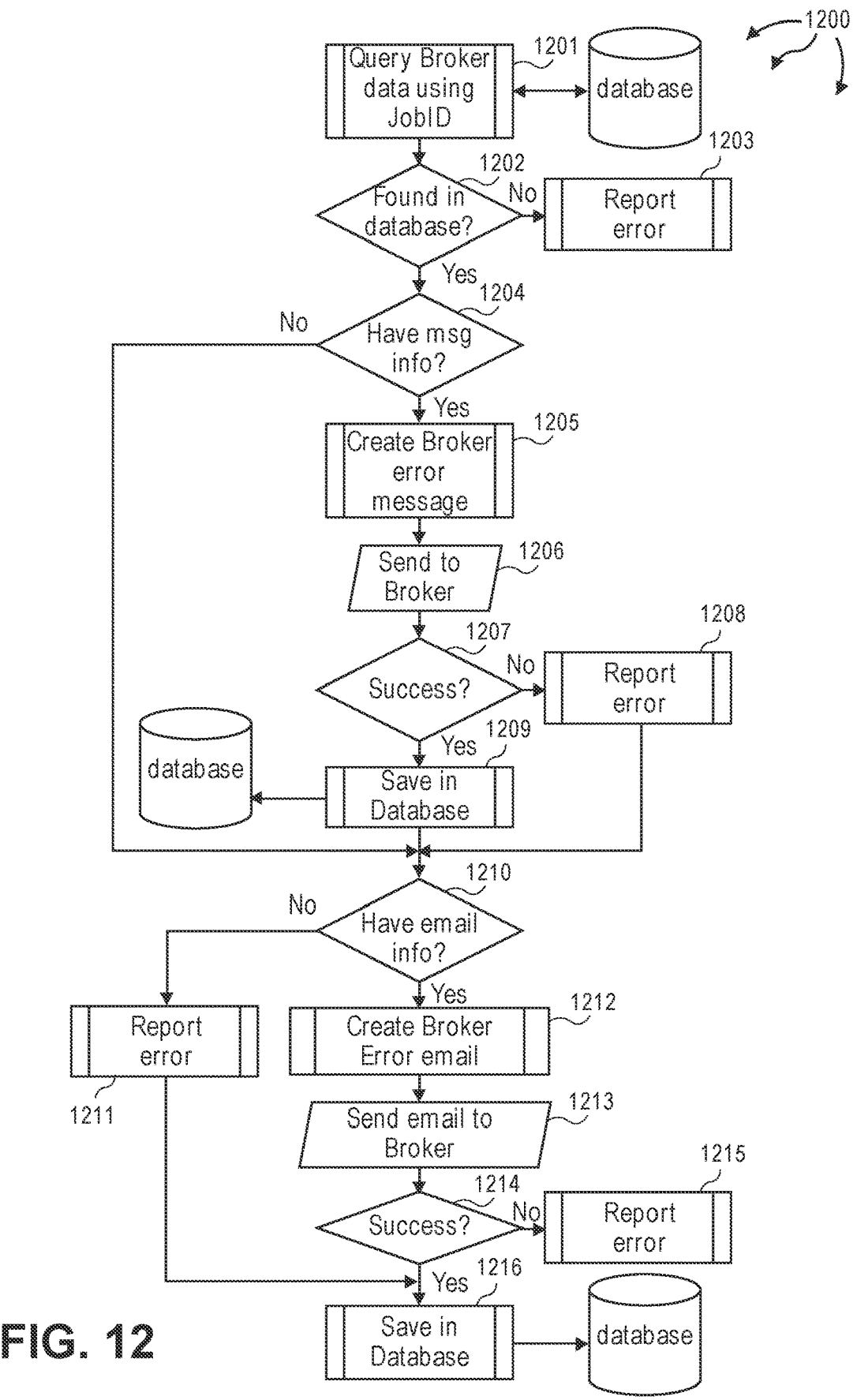
FIG. 12 illustrates a flow chart of an example method for sending a broker error message.

FIG. 12 illustrates a flow chart of an example method 1200 for sending a broker error message. Broker assignment module 417 and communications module 412 can interoperate to implement method 1200. Method 1200 includes querying broker information from transaction and configuration database 421 (e.g., database 221) using JobID (1201). Method 1200 includes determining if broker information was found in transaction and configuration database 421 (e.g., database 221) (1202). If broker information was not found (NO at 1202), method 1200 includes reporting an error (1203). If broker information was found (YES at 1202), method 1200 includes determining if there is broker information available for sending an SMS message (1204). If information is not available for sending an SMS message (NO at 1204), method 1200 transitions to 1210.

If information is available for sending an SMS message (YES at 1204), method 1200 includes creating an SMS broker error message (1205). Method 1200 includes sending the SMS broker error message to the broker (1206). Method 1200 includes determining if sending the SMS message was a success (1207). If sending the SMS message was not a success (NO at 1207), method 1200 includes reporting an error (1208). If sending the SMS message was a success (YES at 1207), method 1200 includes saving an indication of successfully sending the SMS message in transaction and configuration database 421 (e.g., database 221) (1209).

Method 1200 includes determining if there is broker information available for sending an Email message (1210). If information is not available for sending an Email message (NO at 1210), method 1200 includes reporting an error (1211). If information is available for sending an Email message (YES at 1210), method 1200 includes creating an Email broker error message (1212). Method 1200 includes sending the Email message to the broker (1213). Method 1200 includes determining if sending the Email message was a success (1214). If sending the Email message was not a success (NO at 1214), method 1200 includes reporting an error (1215). If sending the Email message was a success (YES at 1214), method 1200 includes saving an indication of successfully sending the Email message in transaction and configuration database 421 (e.g., database 221) (1216).

When a package has been successfully delivered to a recipient, the carrier can send a delivery notification to compute system 401. Computer system 401 can set the transaction to completed and closed in transaction and configuration database 421 (e.g., database 221). The completed transaction can be stored for reporting, analytical and other purposes. When a delivery notification is not received within a configurable specified amount of time post expected delivery date, an exception handling process can be performed. Some carriers subcontract out final delivery and never update their system past that checkpoint. As such, computer system 401 may receive a shipment delivered message. In those cases, and when computer system 401 is aware of the subcontracting, computer system 401 may assume that the package was delivered at the target date.

Figure 13:
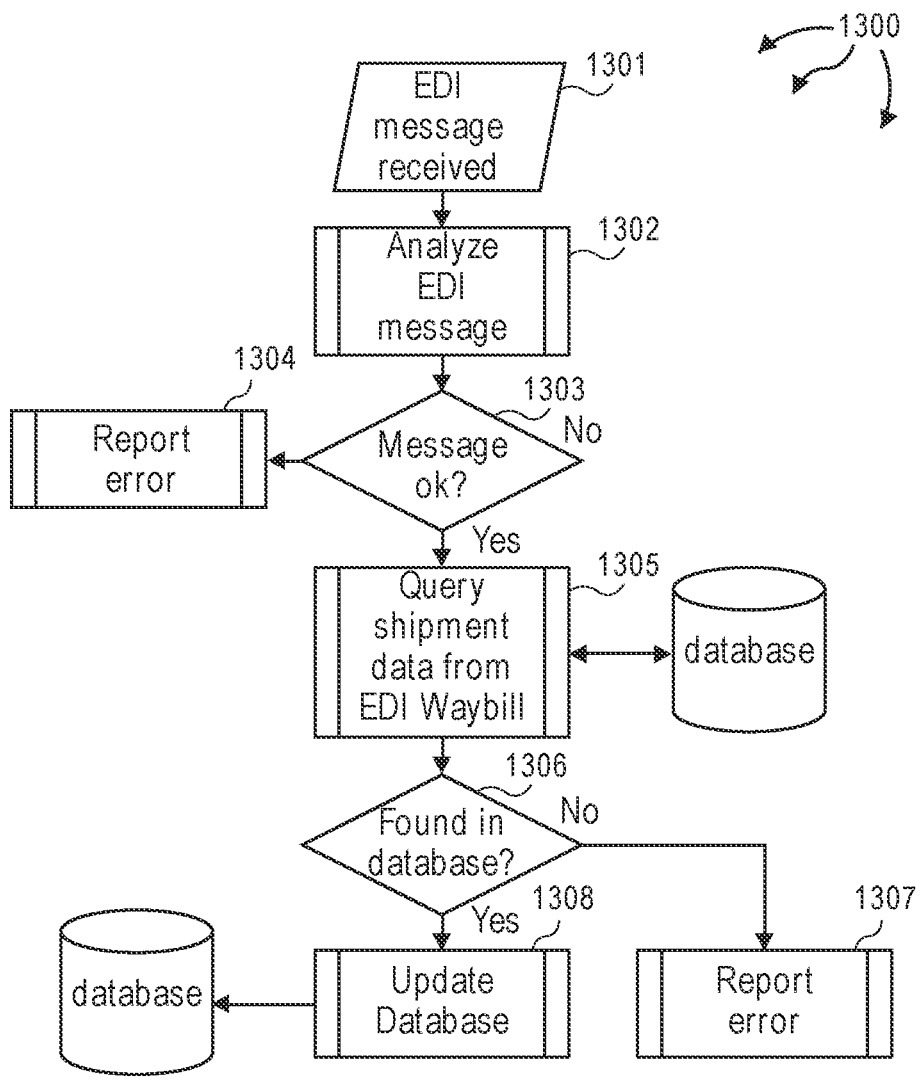
FIG. 13 illustrates a flow chart of an example method for sending a shipment delivered message.

FIG. 13 illustrates a flow chart of an example method for sending a shipment delivered message. Modules of computer system 401 and communications module 412 can interoperate to implement method 1300. Method 1300 includes receiving an EDI (e.g., delivery notification) message (e.g., from a carrier) (1301). Method 1300 includes analyzing the EDI message (1302). Message 1300 includes determining if the EDI message is ok (1303). If the EDI message is not ok (NO at 1303), method 1300 includes reporting an error (1304). If the EDI message is ok (YES at 1303), method 1300 includes querying shipment data from EDI waybill in transaction and configuration database 421 (e.g., database 221) (to determine if the EDI message corresponds to a shipment being tracked by computer system 401) (1305).

Method 1300 incudes determining if the shipment data was found in transaction and configuration database 421 (e.g., database 221) (1306). If the shipment data was not found (NO at 1306), method 1300 includes reporting an error. If the shipment data was found (YES at 1306), method 100 includes updating transaction and configuration database 421 (e.g., database 221) with information from the EDI message (e.g., to indicate that a package was delivered) (1308).

Generally, database 421 can store information regarding an international shipment. Data in database 421 drives transactions workflows. Transaction workflows are asynchronous, and any number of workflows can be implemented for any number of items concurrently. Transaction workflows can access data from database 421 as well as update and store new/additional data in database 421.

When a transaction is closed, information about the transaction can be copied to from database 421 to data lake 422 (with personal information and sensitive information stripped out). Thus, data lake 422 contains data from transactions processed by computer system 401. Data lake 422 can be mined for insights, analytics, and data collections. Insights, analytics, and data collections can be provided to Carriers, brokers and customers. As such, data lake 422 can be leveraged for reflective, prospective, projective, descriptive, predictive, prescriptive and other analytics, patterns and strategic decisions.

In one aspect, database 421 and data lake 422 are SQL, Maria DB or other commercial or open source databases.

Consolidation module 418 can handle consolidation of received payments. Received payments can be consolidated per carrier. An electronic payment can be made to each carrier from collected fees. Electronica payments can be made periodically per carrier requirements, such as, for example, daily, weekly, monthly, quarterly or annually. Consolidation module 418 can also handle disputed transactions, for example if a Payee did not receive a delivery after paying fees. Consolidation module 418 can also handle missing transactions, for example, if a delivery person does not receive a clearing message in time or at all. Computer system 401 can implement industry standards, such as, for example, ANSI X12, for invoicing to/from carriers.

Company website 411 can be hosted by a commercial service provider. Company website 411 can include corporate content and a section for entering login credentials to gain access. Company website 411 can serve as a point of contact customers, Carriers, Payee, brokers, sender, receiver and partners where they can log into the website and review all previous transactions.

On an ongoing basis, broker CSAT module 413 can calculate how each Broker is performing when they are managing a clearing process. Each Broker can be scored on a 1-5 range where 5 is the highest. Thus, lower performing brokers can be identified and weeded out. For example, Brokers that have an averaging CSAT score below a defined average reference value can be removed and not allowed to continue clearing shipments. Any currently Assigned clearing jobs can be removed from the particular Broker and put back on the clearing jobs list to be Assigned to another Broker.

A broker score can be computed automatically based on one or more of: Responsiveness during the clearing process measure from the Assignment date, Filing accuracy, Overall timing for the clearing process, was intervention required during the clearing process, If data or information is needed from Shipper, duration until the Shipper was contacted, If information was needed from Recipient, duration until the Recipient was contacted, clearing time duration from customs submission, once the shipment paperwork has been received by the Broker from the Shipper/Recipient. A broker can be presented with their current score when they are logged in.

Accordingly, computer system 401 can implement methods 500-1300 to clear internationally shipped items through government customs agencies for B2C and B2B. Company 402 can initiate B2C/B2B transaction 451 with carrier 403 to ship a product to recipient 404 in a requested international destination. Company 402 sends waybill 452 to computer system 401. Computer system 401 receives waybill 452 from company 402. Transaction initiation module 416 can save information from waybill 452 in transaction and configuration database 421 (e.g., database 221) as well as in data lake 422.

Broker assignment module 417 posts the clearing job at a broker' website to be assigned. The clearing job can be assigned to broker 406. Broker assignment module 417 can send broker assignment message 453 (as text and/or email) along with the waybill 453 to broker 406. Broker 406 is now responsible for clearing the shipment.

Broker 406 can send EDI message 454 to customs 407 with pertinent information so the shipment can clear customs. Customs 407 clears the shipment. Customs 407 can send clearing EDI message 455 to broker 406 (and possibly also computer system 401 or computer system 401 "taps" into EDI message 455). It may also be that broker 406 relays the information from EDI message 455 to computer system 401. Broker assignment module 417 updates transaction and configuration database 421 (e.g., database 221) as well as in data lake 422 to indicate clearance from customs 407.

Broker assignment module 417 can send EDI message 456 to carrier 403 indicating that the shipment has cleared customs 407. Subsequently, carrier 403 can deliver 457 the shipment to recipient 404. After delivery, carrier 403 can send EDI message 458a to computer system 401 indicating delivery complete. Optionally, carrier 403 can also send EDI message 458b to company 402 indicating delivery complete. Broker assignment module 417 updates transaction and configuration database 421 (e.g., database 221) as well as in data lake 422 to indicate shipment delivery.

Consolidation module 418 can reconcile the overall transaction and pays the Entities. Payment can be done daily/weekly/monthly/quarterly schedule depending on the agreements.

In some aspects, modules in computer architecture 200 include and/or interoperate with modules in computer architecture 400 or vice versa.

In one aspect, one or more processors are configured to execute instructions (e.g., computer-readable instructions, computer-executable instructions, etc.) to perform any of a plurality of described operations. The one or more processors can access information from system memory and/or store information in system memory. The one or more processors can transform information between different formats, such as, for example, shipping information, customs fees, import fee amounts due, import fees paid, payment links, payment notifications, delivery notifications, sender information, recipient information, carrier information, payment received messages, payment indicators, broker signup data, broker CSAT scores, broker signup messages, broker configuration update messages, broker assignment messages, broker error messages, customs clearance messages, etc.

System memory can be coupled to the one or more processors and can store instructions (e.g., computer-readable instructions, computer-executable instructions, etc.) executed by the one or more processors. The system memory can also be configured to store any of a plurality of other types of data generated by the described components, such as, for example, shipping information, customs fees, import fee amounts due, import fees paid, payment links, payment notifications, delivery notifications, sender information, recipient information, carrier information, payment received messages, payment indicators, broker signup data, broker CSAT scores, broker configuration update messages, broker assignment messages, broker error messages, broker signup messages, customs clearance messages, etc.

In the above disclosure, reference has been made to the accompanying drawings, which form a part hereof, and in which is shown by way of illustration specific implementations in which the disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general-purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash or other vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein purposes of illustration and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the disclosure to the precise form disclosed. Many modifications, variations, and combinations are possible in light of the above teaching. Further, it should be noted that any or all of the aforementioned alternate implementations may be used in any combination desired to form additional hybrid implementations of the disclosure.

What is claimed:

1. A computer system comprising:
a processor;
system memory coupled to the processor and storing instructions configured to cause the processor to:
electronically receive shipping information in a first data format and indicating that an internationally shipped item is to enter a country under control of a carrier destined for delivery to an intended recipient at a physical location in the country;
convert the shipping information from the first data format into a common database format;
store the shipping information in a database record in the common database format;
set a payment indicator in the database record indicating that import fees for the internationally shipped item are unpaid;
assign a previously registered customs broker to the internationally shipped item based at least on: the previously registered customs broker's location, the previously registered customs broker's licensure in the country, and a broker effectiveness score corresponding to the previously registered customs broker and indicating the historical effectiveness of the previously registered customs broker clearing internationally shipped items through a customs agency of the country relative to one or more other previously registered customs brokers clearing internationally shipped items through the customs agency of the country;
store the customs broker assignment in the database record;
automatically, without user intervention, and responsive to assigning the previously registered customs broker, electronically notify the previously registered customs broker, the carrier, and a shipper that the previously registered customs broker is handling clearing the international shipment through the customs agency of the country;
monitor an electronic customs feed;
identify an import fees due amount corresponding to the internationally shipped item in the electronic customs feed;
electronically send the import fees due amount along with an electronic payment link to the shipper;
electronically receive an indication of import fees payment subsequent to sending the payment link;
transition the payment indicator to indicate that the import fees are paid;
electronically send a payment received notification to the carrier; and
electronically receive a delivery notification that the internationally shipped item was delivered to the recipient subsequent to sending the payment received notification.

2. The computer system of claim 1, wherein instructions configured to identify an import fees due amount comprise instructions configured to identify an import fees due amount in a second data format; and
further comprising instructions configured to, prior to sending the import fees due amount:
convert the import fees due amount from the second data format into the common database format;
store the import fees due amount in the database record in the common database format; and
wherein instructions configured to electronically send the import fees due amount along with an electronic payment link to the shipper comprise instructions configured to electronically access the import fees due about from the database record.

3. The computer system of claim 1, wherein instructions configured to electronically notify the previously registered customs broker that the previously registered customs broker is handling clearing the international shipment through the customs agency of the country comprise instructions configured to send an electronic broker assignment message, including one or more of: a waybill/tracking number, a commercial invoice, or bill of lading, to the previously registered customs broker in a local language of the previously registered customs broker.

4. The computer system of claim 1, wherein instructions configured to monitor an electronic customs feed comprise instructions configured to monitor a customs feed in an Electronic Data Interchange (EDI) format.

5. The computer system of claim 1, wherein instructions configured to identify an import fees amount due corresponding to the internationally shipped item comprise instructions configured to identify one or more of: a duty or a Value Added Tax (VAT).

6. The computer system of claim 1, further comprising instructions configured to, prior to receiving the shipping information, register the previously registered customs broker, including receiving information about the previously registered customs broker selected from among: a name, an address, a broker license number, a list of licensed countries, years of experience, number of previous clearances performed, or number of previous clearances expected.

7. The computer system of claim 1, further comprising instructions configured to calculate the broker effectiveness score from one or more of:
responsiveness of the previously registered customs broker, filing accuracy of the previously registered customs broker, or timeliness of the previously registered customs broker.

8. The computer system of claim 1, further comprising instructions configured to receive a posting from the shipper requesting clearance of the internationally shipped item; and
wherein instructions configured to electronically access shipping information comprise instructions configured to access the shipping information from the posting.

9. The computer system of claim 1, further comprising instructions configured to, prior to receiving the shipping information, register the previously registered customs broker, including receiving information about the previously registered customs broker selected from among: a name, an address, a broker license number, a list of licensed countries, years of experience, number of previous clearances performed, or number of previous clearances expected.

10. A processor implemented method comprising:
electronically receiving shipping information in a first data format and indicating that an internationally shipped item is to enter a country under control of a carrier destined for delivery to an intended recipient at a physical location in the country;
convert the shipping information from the first data format into a common database format;
store the shipping information in a database record in the common database format;
set a payment indicator in the database record indicating that import fees for the internationally shipped item are unpaid;
assigning a previously registered customs broker to the internationally shipped item based at least on: the previously registered customs broker's location, the previously registered customs broker's licensure in the country, and a broker effectiveness score corresponding to the previously registered customs broker and indicating the historical effectiveness of the previously registered customs broker clearing internationally shipped items through a customs agency of the country relative to one or more other previously registered customs brokers clearing internationally shipped items through the customs agency of the country;

automatically, without user intervention, and responsive to assigning the previously registered customs broker, electronically notifying the previously registered customs broker, the carrier, and a shipper that the previously registered customs broker is handling clearing the international shipment through the customs agency of the country;

monitoring an electronic customs feed;

identifying an import fees due amount corresponding to the internationally shipped item in the electronic customs feed;

electronically sending the import fees due amount along with an electronic payment link to the shipper;

electronically receiving an indication of import fees payment subsequent to sending the payment link;

transitioning the payment indicator to indicate that the import fees are paid;

electronically sending a payment received notification to the carrier; and electronically receiving a delivery notification that the internationally shipped item was delivered to the recipient subsequent to sending the payment received notification.

11. The method of claim 10, wherein identifying an import fees due amount comprises identifying an import fees due amount in a second data format; and further comprising:
converting the import fees due amount from the second data format into the common database format;
storing the import fees due amount in the database record in the common database format; and
wherein electronically sending the import fees due amount along with an electronic payment link to the shipper comprises electronically accessing the import fees due about from the database record.

12. The method of claim 10, wherein electronically notifying the previously registered customs broker that the previously registered customs broker is handling clearing the international shipment through the customs agency of the country comprises sending an electronic broker assignment message, including one or more of: a waybill/tracking number, a commercial invoice, or bill of lading, to the previously registered customs broker in a local language of the previously registered customs broker.

13. The method of claim 10, wherein monitoring an electronic customs feed comprises monitoring a customs feed in an Electronic Data Interchange (EDI) format.

14. The method of claim 10, wherein identifying an import fees amount due corresponding to the internationally shipped item comprises identifying one or more of: a duty or a Value Added Tax (VAT).

15. The method of claim 10, further comprising, prior to receiving the shipping information, registering the previously registered customs broker, including receiving information about the previously registered customs broker selected from among: a name, an address, a broker license number, a list of licensed countries, years of experience, number of previous clearances performed, or number of previous clearances expected.

16. The method of claim 10, further comprising calculating the broker effectiveness score from one or more of: responsiveness of the previously registered customs broker, filing accuracy of the previously registered customs broker, or timeliness of the previously registered customs broker.

17. The method of claim 10, further comprising receiving a posting from the shipper requesting clearance of the internationally shipped item; and wherein instructions configured to electronically access shipping information comprise instructions configured to access the shipping information from the posting.

18. A computer system comprising:
a processor;
system memory coupled to the processor and storing instructions configured to cause the processor to:
electronically receive shipping information indicating that an internationally shipped item is to enter a country under control of a carrier destined for delivery to an intended recipient at a physical location in the country;
assign a previously registered customs broker to the internationally shipped item based at least on: the previously registered customs broker's location, the previously registered customs broker's licensure in the country, and a broker effectiveness score corresponding to the previously registered customs broker and indicating the historical effectiveness of the previously registered customs broker clearing internationally shipped items through a customs agency of the country relative to one or more other previously registered customs brokers clearing internationally shipped items through the customs agency of the country;
automatically, without user intervention, and responsive to assigning the previously registered customs broker, electronically notify the previously registered customs broker, the carrier, and a shipper that the previously registered customs broker is handling clearing the international shipment through the customs agency of the country;
monitor an electronic customs feed;
identify an import fees due amount in a first data format and corresponding to the internationally shipped item in the electronic customs feed;
convert the import fees due amount from the first data format into the common database format;
store the import fees due amount in the database record in the common database format;
accessing the import fees due about from the database record;
electronically send the import fees due amount along with an electronic payment link to the shipper;
electronically receive an indication of import fees payment subsequent to sending the payment link;
electronically send a payment received notification to the carrier; and
electronically receive a delivery notification that the internationally shipped item was delivered to the recipient subsequent to sending the payment received notification.

19. The computer system of claim 18, wherein instructions configured to electronically access shipping information comprise instructions configured to electronically receiving the shipping data in a second data format; and
further comprising instructions configured to:
convert the shipping information from the second data format into a common database format; and
store the shipping information in a database record in the common database format.

20. The computer system of claim 18, further comprising instructions configured to calculate the broker effectiveness score from one or more of: responsiveness of the previously registered customs broker, filing accuracy of the previously registered customs broker, or timeliness of the previously registered customs broker.

* * * * *